United States Patent
Cook

(10) Patent No.: US 9,878,725 B2
(45) Date of Patent: Jan. 30, 2018

(54) LOCOMOTIVE NATURAL GAS STORAGE AND TRANSFER SYSTEM

(71) Applicant: David Cook, Fullerton, CA (US)

(72) Inventor: David Cook, Fullerton, CA (US)

(73) Assignee: RAIL GAS TECHNOLOGIES, Glendora, CA (US)

( * ) Notice: Subject to any disclaimer, the term of this patent is extended or adjusted under 35 U.S.C. 154(b) by 309 days.

(21) Appl. No.: 14/853,997

(22) Filed: Sep. 14, 2015

(65) Prior Publication Data

US 2016/0068170 A1    Mar. 10, 2016

Related U.S. Application Data

(63) Continuation-in-part of application No. 14/216,992, filed on Mar. 17, 2014, now Pat. No. 9,255,506.

(Continued)

(51) Int. Cl.
*F17C 13/08*    (2006.01)
*B61C 17/02*    (2006.01)

(52) U.S. Cl.
CPC .............. *B61C 17/02* (2013.01); *F17C 13/08* (2013.01); *F17C 2201/0109* (2013.01);
(Continued)

(58) Field of Classification Search
CPC .. B61C 17/02; F17C 13/08; F17C 2205/0192; F17C 2201/0109; F17C 2201/035; F17C 2201/054; F17C 2201/056; F17C 2203/0391; F17C 2203/0619; F17C 2203/0629; F17C 2203/0663; F17C 2205/0107; F17C 2205/0111; F17C 2205/0134; F17C 2205/0188; F17C 2221/012; F17C 2221/033; F17C 2223/0161; F17C 2223/036; F17C 2227/0135; F17C 2270/0173; F17C 2223/0123; F17C 13/084; F17C 2270/0171; F17C 2205/0142; F17C 2205/013;
(Continued)

(56) References Cited

U.S. PATENT DOCUMENTS 2,949,854 A  *  8/1960  Stewart ................... F02C 7/272
                                                     102/531
3,487,971 A  *  1/1970  Gay ...................... F17C 13/088
                                                     220/560.1

(Continued)

*Primary Examiner* — Mark T Le
(74) *Attorney, Agent, or Firm* — Richards Patent Law P.C.

(57) ABSTRACT

An enclosure for containing cylinders includes an upper surface, a lower surface, opposing side walls spanning the upper and lower surfaces, and an end surface spanning the upper and lower surfaces, the upper surface, lower surface, side walls, and end surface defining an enclosed space. A plurality of inner walls divides the enclosed space to define bays. A removable door panel is opposite the end surface and includes dividers defining portions of the door panel corresponding to the bays. The enclosure includes a plurality of first contact pads, a plurality of first mounting plates, a plurality of second contact pads, and a plurality of second mounting plates. At least one first contact pad and at least one second contact pad is positioned in a corner of each bay and each portion, respectively, at an angle that is neither parallel or perpendicular to either the side walls or the upper surface.

9 Claims, 22 Drawing Sheets

Related U.S. Application Data

(60) Provisional application No. 62/049,651, filed on Sep. 12, 2014, provisional application No. 62/128,296, filed on Mar. 4, 2015, provisional application No. 61/790,771, filed on Mar. 15, 2013.

(52) U.S. Cl.
CPC .. *F17C 2201/035* (2013.01); *F17C 2201/054* (2013.01); *F17C 2201/056* (2013.01); *F17C 2203/0391* (2013.01); *F17C 2203/0619* (2013.01); *F17C 2203/0629* (2013.01); *F17C 2203/0663* (2013.01); *F17C 2205/0107* (2013.01); *F17C 2205/0111* (2013.01); *F17C 2205/0134* (2013.01); *F17C 2205/0188* (2013.01); *F17C 2205/0192* (2013.01); *F17C 2221/012* (2013.01); *F17C 2221/033* (2013.01); *F17C 2223/0123* (2013.01); *F17C 2223/0161* (2013.01); *F17C 2223/036* (2013.01); *F17C 2227/0135* (2013.01); *F17C 2270/0173* (2013.01); *Y02E 60/321* (2013.01)

(58) Field of Classification Search
CPC ........... F17C 2270/0168; Y02E 60/321; B60K 15/07; B60K 15/063; B60K 2015/03118; B60K 15/067; B60P 3/055; B60P 7/12; B60P 1/6418; B60P 3/222
USPC ...................................................... 312/293.3
See application file for complete search history.

(56) References Cited

U.S. PATENT DOCUMENTS

| | | | | |
|---|---|---|---|---|
| 4,391,377 | A * | 7/1983 | Ziaylek, Jr. ........... | A47B 81/007 206/443 |
| 6,976,594 | B1 * | 12/2005 | Young ................... | F17C 13/084 211/194 |
| 2008/0164251 | A1 * | 7/2008 | Fawley ................. | B65D 88/128 220/1.5 |
| 2010/0011782 | A1 * | 1/2010 | Matthias ................... | F17C 3/08 62/45.1 |
| 2011/0210029 | A1 * | 9/2011 | Ontjes ..................... | F17C 13/00 206/457 |
| 2014/0061266 | A1 * | 3/2014 | Milton ..................... | F17C 5/06 224/404 |
| 2016/0290564 | A1 * | 10/2016 | Croteau .................... | F17C 1/14 |

* cited by examiner

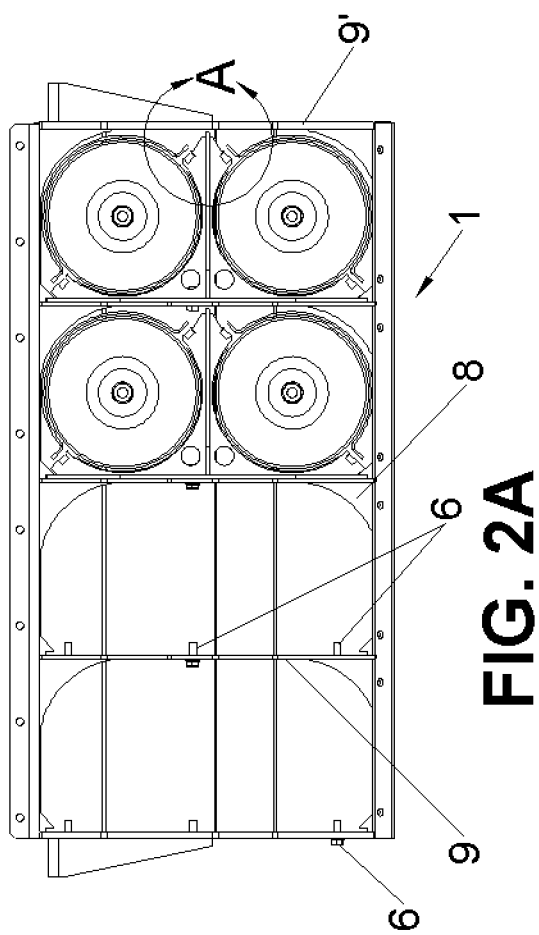
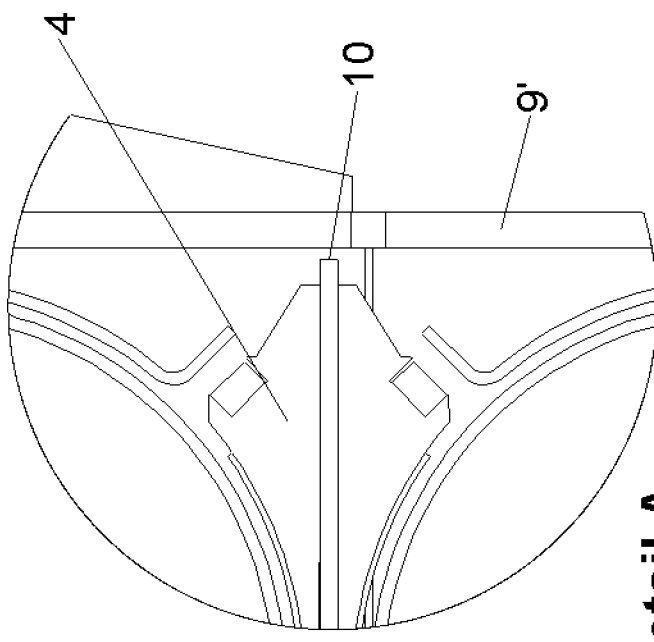

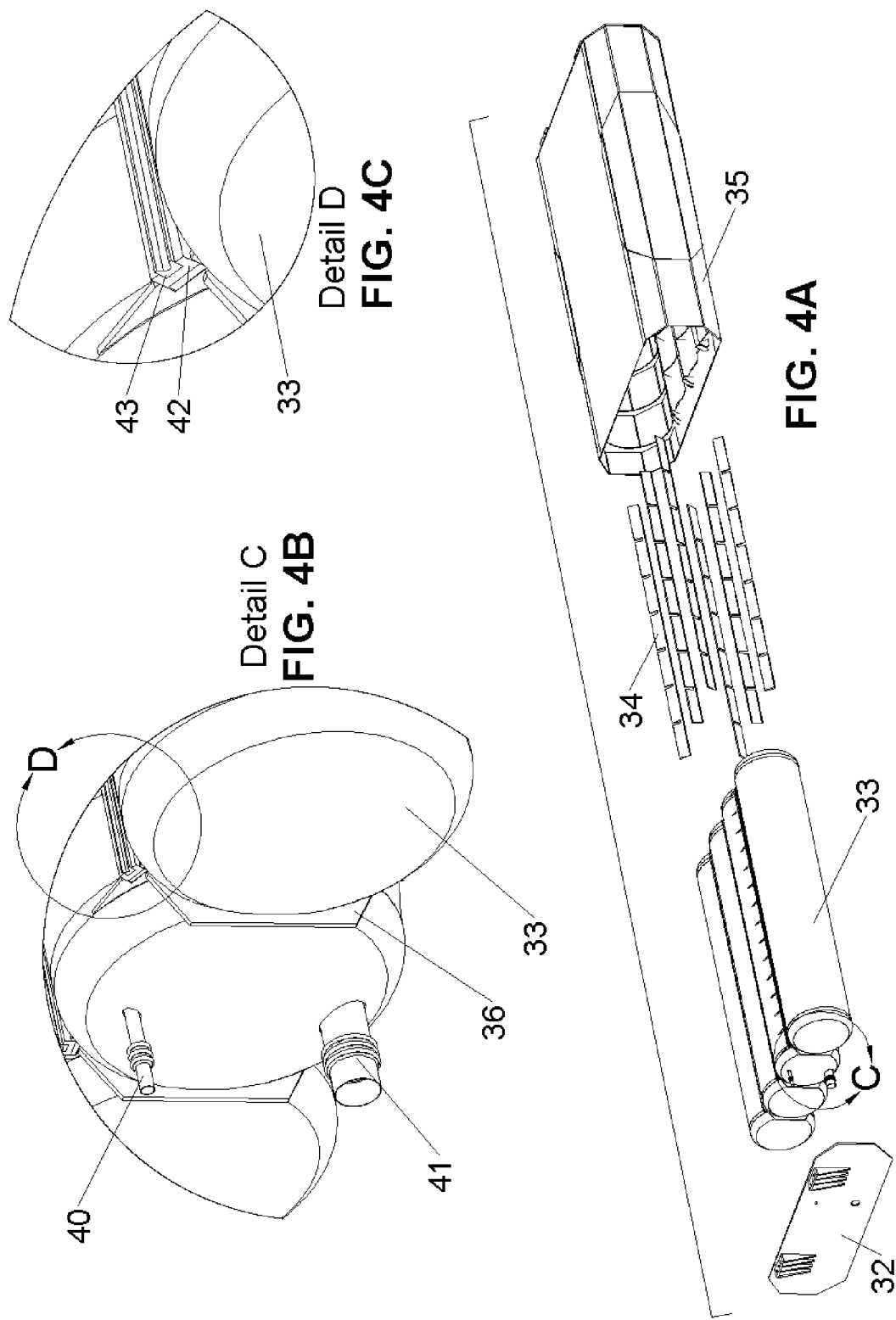

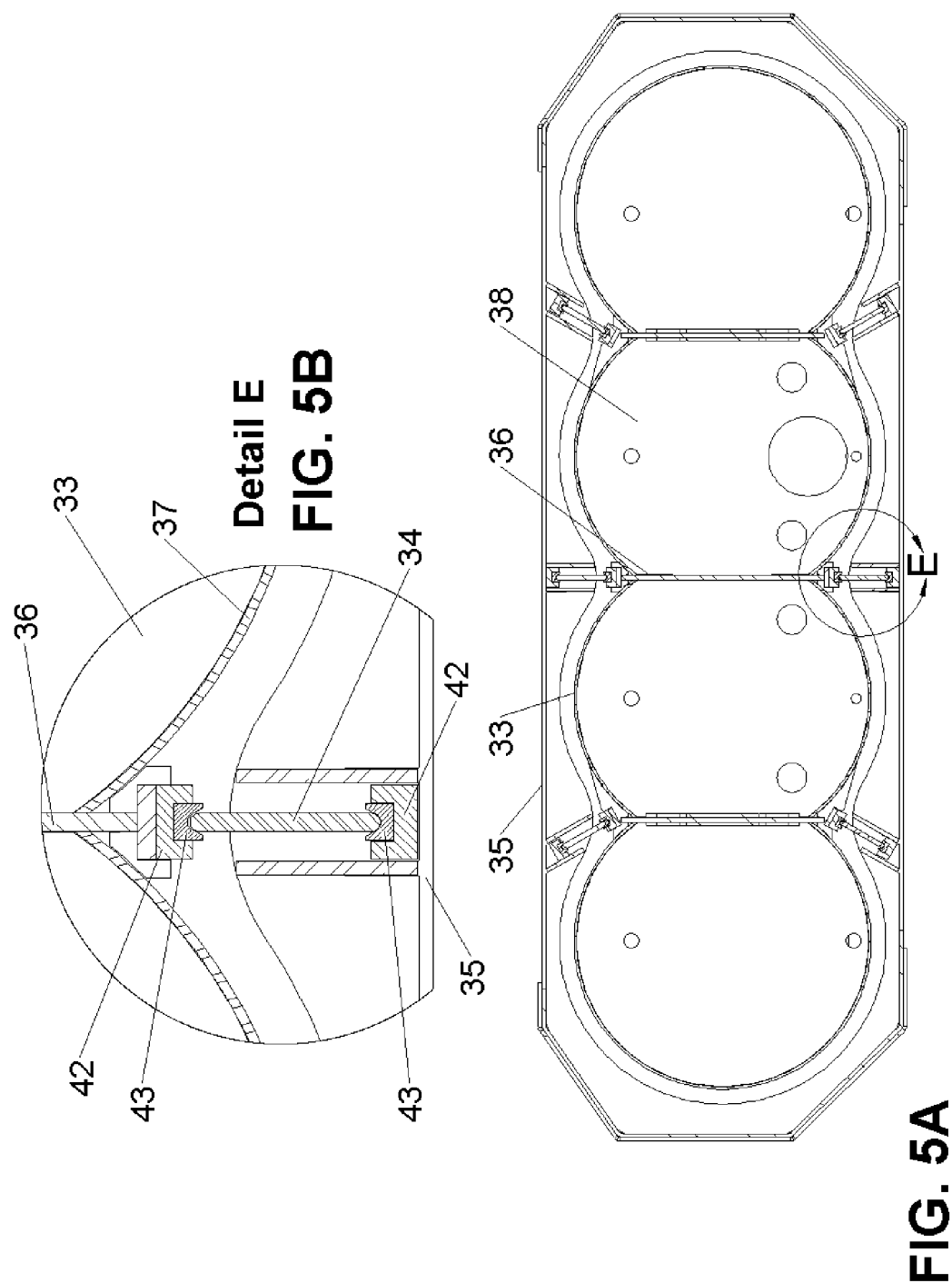

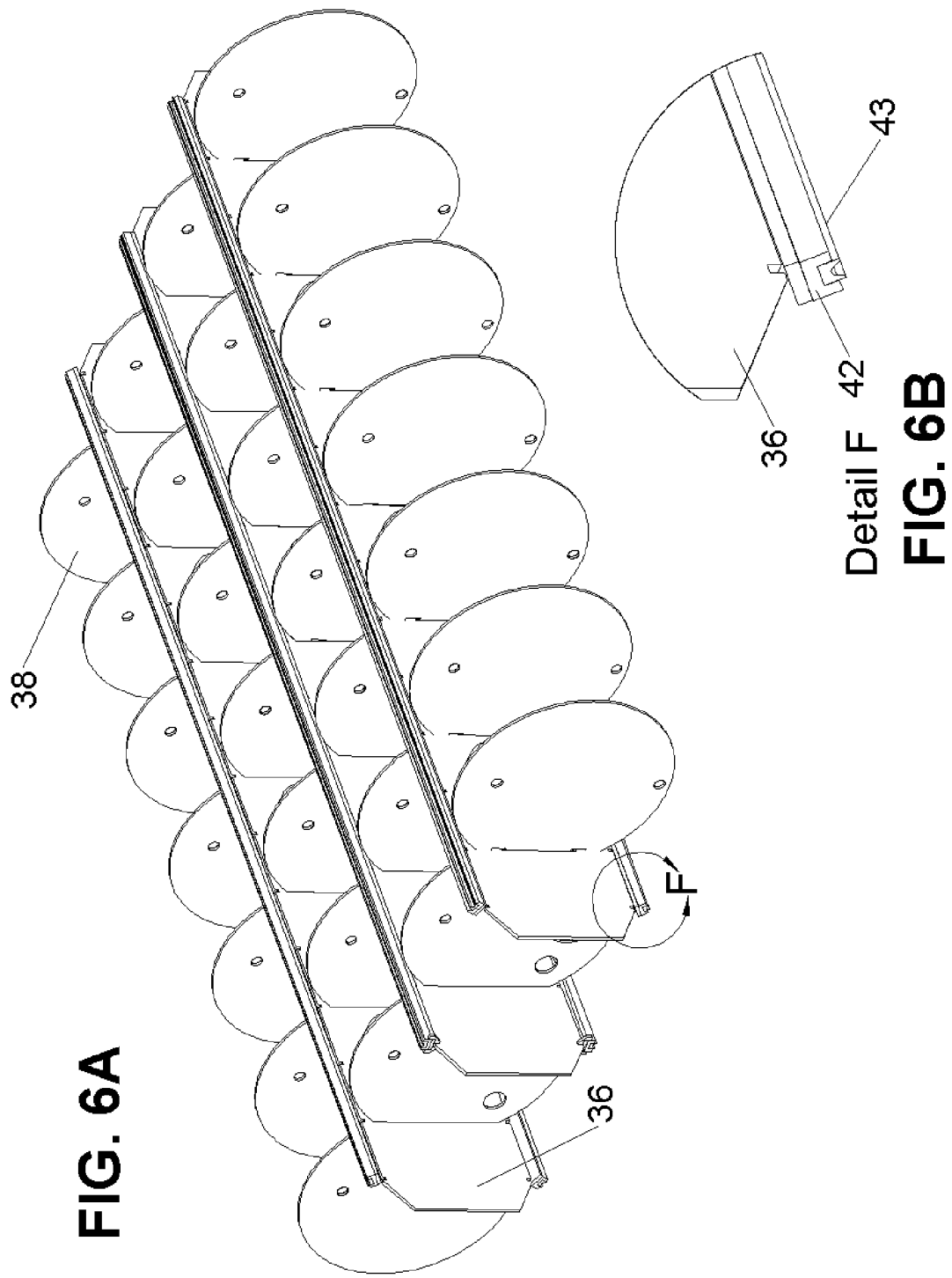

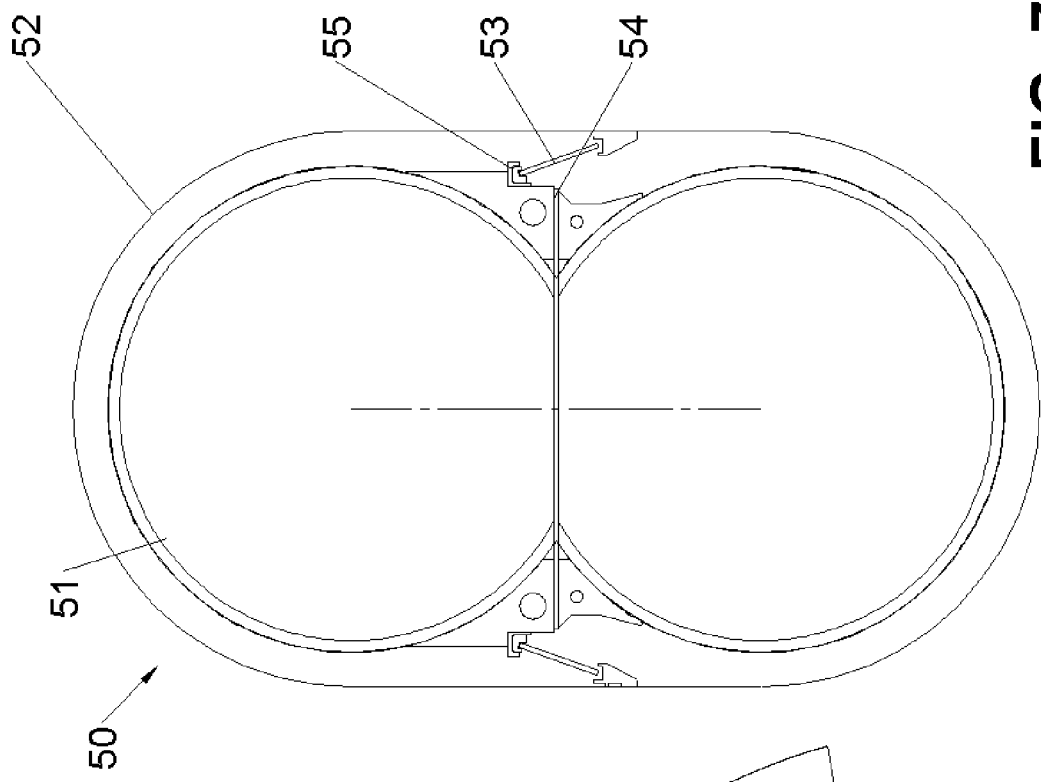
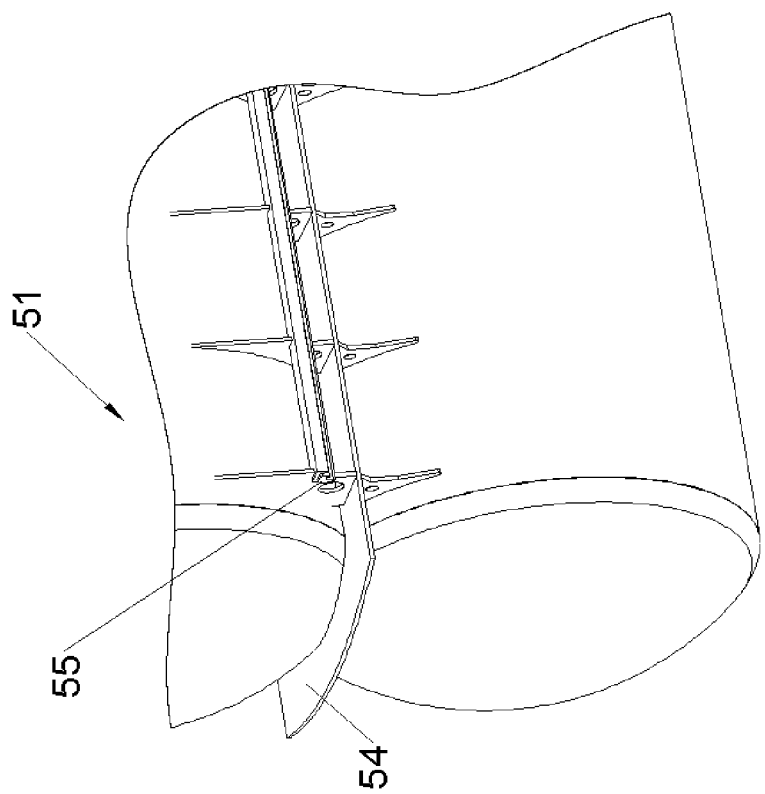

Detail K

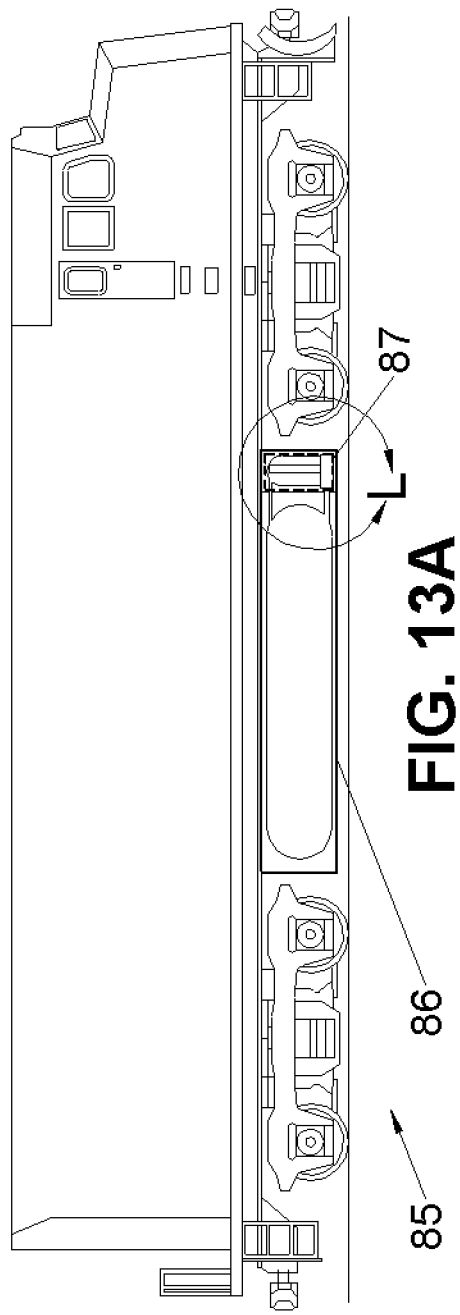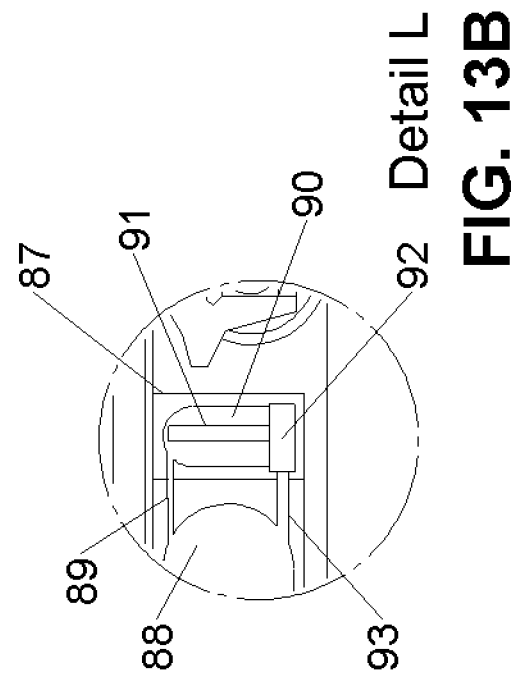

LOCOMOTIVE NATURAL GAS STORAGE AND TRANSFER SYSTEM

CROSS-REFERENCE TO RELATED APPLICATIONS

This application claims the benefit of priority to U.S. Provisional Application No. 62/049,651 filed on Sep. 12, 2014, and U.S. Provisional Application No. 62/128,296, filed Mar. 4, 2015, and is a continuation-in-part of U.S. application Ser. No. 14/216,992, filed Mar. 17, 2014, which claims the benefit of priority to U.S. Provisional Application No. 61/790,771 filed on Mar. 15, 2013, the disclosures of which are incorporated by reference herein.

BACKGROUND OF THE INVENTION

Current state of the art for storage and transfer of natural gas (NG) to engines used in mobile off road applications consist primarily of commonly available components and existing technology configured for demonstration. The storage tanks and support equipment used in existing systems are repurposed from other industries in commercially available sizes and configurations that are less than ideal for high horsepower, mobile applications. For locomotive applications, these systems are made up of dedicated NG tender cars, or standard tanks mounted on flat railcars or fixed underframe between the trucks.

As a result, existing systems for locomotives, both CNG and LNG, have been limited to specific local application and pilot or research projects that do not necessarily require large storage capacity, ease of service, maintainability or adherence to regulations such as crash worthiness necessary for general use on freight and passenger lines. In off road mobile applications, the most significant technical challenge is attaining the necessary DGE capacity to motivate manufacturers and end users to convert from diesel fuel. In packaging of the NG tanks to attain a sufficiently high storage capacity and required crashworthiness, it is still important that the system still be simple, reliable and easy to maintain. Further this should be done with minimal or no perceived impact to the end user.

For tenders and flat cars, it is possible to attain acceptable storage capacity, but results in additional rail cars to the train consist and/or added weight and complexity for the operators to deal with. Tanker cars or tanks on flat beds must be modified by adding structure and reinforcement necessary in order to make them meet safety and crashworthiness requirements for tender car use. For underframe storage, these existing components and packaging schemes limit the storage density, thus limiting the range, performance and functionality of the vehicle the system is supporting. Underframe or belly mounted tanks in place of or in addition to the existing fuel tanks on the locomotive present greater challenges in package and storage capacity as well as introducing additional requirements for crash worthiness criteria and other safety regulations. Current underframe NG storage systems have been limited to 200 DGE (diesel gallon equivalent). In order for natural gas fueled solutions to be commercially viable for locomotives, 600 DGE or more must be attained. Prior locomotive tank systems such as the CNG system on the Napa Valley Wine train have conventional Type 1 steel tanks installed under frame longitudinally on the locomotive along the axis of train motion. This approach makes mounting and servicing the tanks less than ideal as it requires removing the enclosure with all the tanks at once as one assembly. Another downside of this type of longitudinal tank arrangement is its lack of storage density when the longitudinal space to put the tanks in is less than 9 feet as it is with typical switcher locomotives. This results in a higher quantity of shorter tanks, reducing the storage capacity and increasing the cost as well as the number of components and potential leak points.

For both tender car and underframe NG storage, maximizing capacity requires close spacing of the NG cylinders making mounting the tanks in tender cars or under frame enclosures a challenge. There are currently two common methods of mounting NG cylinders, strap mounting with two steel straps wrapped around the outer diameter of the tank, or neck mounting with block mounts capturing a large pin at each end of the tank. In strap mounting, rubber isolator strips are placed between the mount straps and the surface of the tank to both prevent damage to the outer composite skin, and to allow the tanks to grow slightly in length and diameter when they are filled. In pin mounting, one end of the tank is fixed into position to prevent rotation, while the other end has a loose fitting mount block which allows the pin to slide axially as the tank grows in length during filling.

The most common application of CNG cylinders such as these is municipal transit buses. In transit buses the tanks are slightly shorter than proposed laterally mounted locomotive tanks and they are typically neck mounted. Neck mounting would appear to offer the easiest mounting in the tight locomotive enclosure, but there are distinct and important differences between the switcher duty cycle and the transit bus cycle. The switcher has metal on metal wheels and will see significantly more vertical vibration, this will affect the loose fit in the sliding pin block causing degradation of the pin material where it meets the block, as the locomotive CNG tank is longer and heavier it could also cause fatigue in the aluminum neck boss material and a tank failure at the tank neck. Another important factor is the life cycle; buses are in service typically 10 to 12 years, whereas 50 year old switchers are still being rebuilt today. The most significant detriment to the neck mounting system is the operation of the switcher locomotive, its primary purpose is to frequently couple and uncouple with rail cars, and these coupling events lead to repeated impulse loads of several g's. These repeated impulses could be a fatigue risk to conventional neck mounted composite CNG cylinders if the loads are significant and perpendicular to the axis of the tank.

Strap mounting of the CNG cylinders would overcome this impulse loading issue. The issue with strap mounting of CNG cylinders is that access is needed to tighten the straps from the side and this will require spacing the tanks further apart thus reducing the total number of CNG cylinders and total fuel capacity.

As natural gas has been introduced as a fuel for the railroad industry there has been a focus on using Liquefied natural gas (LNG) as the storage medium for increased range over using compressed natural gas (CNG). LNG was also considered the best fuel storage system for transit buses when natural gas was first used for that application. Most of the original LNG transit buses have since been replaced by CNG as the technology of the CNG tanks has improved. LNG currently has many disadvantages over CNG. LNG plants have to be built very large to economically make LNG, up until 2012 there were only three LNG plants constructed specifically to make LNG for transportation use. LNG tanks absorb heat from the outside and if the tanks are left to sit they will vent methane gas. This becomes a problem when an agency has several hundred busses with some of them idle. Also as LNG is stored for a long period of time and is venting, its percentage of methane will drop over time as methane boils off first. This effect is called weathering and as the fuel weathers its octane rating decreases as the percentage of methane decreases and its percentage of lower octane propane, butane and other 'thanes' increases. Using fuel that has weathered too long can result in engine damage.

Current mobile LNG storage and delivery systems for natural gas fueled engines are passive and controlled by regulating the vaporization of the LNG to CNG at the necessary pressure for the fuel system application it is supporting. Using this approach, the LNG in the tank is maintained at or near the vaporization temperature for the natural gas at the required supply pressure either by removing LNG from the tank to cool and lower the pressure or heating the tank externally to allow more vaporization to raise the pressure. The vaporization based systems are typically designed to operate at approximately 125 psi and must maintain a specific temperature range of −130+/−10 degrees Celsius in order to provide sufficient fuel pressure to the engines fuel management system. As a result, using the vaporization point of the natural gas to control fuel delivery is a proven concept but it reduces the amount of LNG that can be stored in a given tank, the pressure it is supplied at, and the time that it can be maintained in liquid state within the fixed volume of the tank before it vaporizes and must be purged. Further this system requires heat to be added to the tank to raise the pressure or off gassing or flaring of vaporized natural gas if it is not consumed in time by the engine, both of which expend energy or release fuel which further reduced range and efficiency In order to refuel a system like this, the filling equipment typically saturates the fuel by adding heat. If a vehicle is not filled with saturated fuel, it may take a significant amount of time to raise the equalized saturation temperature and pressure in the tank so that the vehicle engine can be operated at full power. This is especially a problem when refueling large pieces of offload equipment from LNG tanker trucks.

A further challenge in passive LNG tank systems is maintaining the required tank pressure when the engine is at high loads and consuming a large amount of fuel over an extended time. When LNG fuel is withdrawn from the tank, a small amount of the remaining LNG will boil off to bring the tank pressure back to equilibrium. When this small amount of fuel boils off, it absorbs a large amount of latent heat and chills the remaining liquid. This was a particular problem with the LNG switchers at LA Junction RR, the locomotives could only operate at high power for a short time before low LNG tank pressure forced the system to reduce engine power output.

The next portion of the background covers an improvement to filament wound Type 2 high pressure gas cylinders. Wire wound Type 2 CNG cylinders are becoming a viable option for larger high pressure applications or applications where the service pressure is extremely high. Two examples of this challenge are the design of 36 inch diameter pressure vessels at 4500 psi and 16 inch diameter pressure vessels at pressures up to 12,700 psi. The material challenge to this is getting large seamless tubing extruded or formed at the necessary wall thick in lengths that is useful. The specific seamless tube needed to manufacture a 36 inch diameter Type 1 cylinder would be almost 1.25 inch thick.

If this material were available in this size, it would weigh 461 pound per foot. For a 9-foot long cylinder, it would weight over 4,000 pounds per tube.

There is a great deal of progress being made in Type 3 cylinders that overcome these size limitations, but they rely on expensive composite materials and are not tolerant of high temperatures, the typical aluminum liners will eventually fatigue, and the seamless aluminum material needed for the liners is only available up to 24 inches.

For ground based applications and some mobile applications such as rail where weight is not a significant concern a steel or at least all metal solution is both practical and likely preferred from a safety and longevity standpoint. The most up to date composite Type 3 and 4 cylinders have to be discarded after 20 years, some locomotives being rebuilt today are 50 years old.

The Type 2 cylinder offers some promise in these larger size and lower weight sensitive applications. A Type 2 cylinder is typically a seamless steel cylinder similar to a Type 1 cylinder with a fiber winding added only along the axial length of the cylinder where the cross section remains constant.

A further improvement to the Type 2 cylinder is using ultra high tensile strength steel wire as the fiber that is wound around the cylinder. This is a specialty of Wire Tough Cylinders of Bristol, Va. When metal wire is used as the winding fiber, the cylinder has drastically improved high temperature capabilities and impact resistance.

Fundamentally, by simply reinforcing the cylinder with enough outer fiber to manage the hoop stresses, a Type 2 cylinder with the appropriate fiber winding would have twice the pressure capability of an equivalent Type 1 cylinder. Further, ultra high tensile strength monofilament wire has three times the tensile strength of the heat treated 4130 liner material. If the thinnest liner possible was used, the wire wound Type 2 cylinder could be 35% or more lighter than a normal Type 1 cylinder. In the case of published data on Wire Tough Type 2 cylinders the weight reduction is typically 23%.

There is a challenge in the basic construction of the Type 2 cylinders regarding the region at the ends of the cylinder where the liner transitions from the constant cross section cylinder to the end dome shape. Along the length of the constant cross section cylinder, the wire fibers are trapped in place by the neighboring wires. If the wiring winding was to go past the point of tangency on the liner into the area of the dome, the tapering surface of the dome poses a problem with the wire wrapping. As the dome surface tapers the wires can slide along the surface to relieve internal stress and loading, and will therefore not fully perform the function of carrying the hoop stresses of the cylinder at that point. In order to avoid this issue, the wire wrapping on a Type 2 cylinder will usually stop slightly before the tangent point, and taper from a reduced wrap thickness at the end to the wraps full thickness further away from the tangent point. What this creates is a weak point at the tangency point where after repeated cyclic testing to failure the vessel will rupture.

This causes the Type 2 cylinder manufacturer to use a thicker than ideal liner to overcome this weak point. This has several negative effects; it increases the weight and cost of the cylinder, and also reduces the CNG cylinders capacity for the same size OD liner or Type 2 cylinder assy.

What would be preferable would be a simple way to extend the wrap section past this tangency point to overcome this weakness allowing the thinnest liner possible to be used with an optimized thickness wire wrap.

Throughout this document, certain systems have been described for use with CNG, or LNG cylinders or vessels. It should be noted that these concepts would be usable for high pressure or cryogenic vessels containing any pressurized and/or liquefied gaseous fuel including hydrogen.

ISO Tank Module: Intermodal tank system with an ISO specified frame for stacking with other intermodal containers.

SUMMARY OF THE INVENTION

The proposed invention is an integrated on vehicle natural gas storage and transfer system (CNG or LNG) that maximizes storage capacity, minimizes space claim and structure weight, and incorporates specific features to meet or exceed the industry performance, safety and functional requirements for general rail use. The system is modular and adaptable for under frame or tender car storage applications consisting of mounting frames or enclosures and tank modules that are contained within them. The frames and enclosures are specifically designed for tender car or underframe mounting and can support commercially available cylinders and tanks or specially developed tank modules. The tank modules are removable, serviceable units fitted with optimized cylinders or tanks allowing ideal integration solutions for CNG or LNG storage.

The first portion of the summary relates to a crashworthy underframe CNG cylinder storage enclosure. In order to encourage the conversion of locomotives to natural gas as a fuel, customers will need enough fuel storage capacity to accomplish the needed work with minimal changes to current operations and refueling schedules. At the same time that high fuel storage capacity is important, the system must be economical to purchase, meet crashworthy requirements and be easy to maintain.

There are two main components to the Locomotive Underframe CNG Fuel storage System. There is the main crashworthy enclosure, and the required one or more CNG cylinder modules The under frame enclosure is a hardened encasement for the tanks modules to be contained within. The enclosure is built as an armored box capable of absorbing both the side impact of a class 8 truck and support the weight of the locomotive if it were to derail and land on the steel rail supporting the locomotive weight on the fuel tank bottom. At the same time this enclosure has to be protective, it also has to allow the tanks inside it to be serviceable. The ideal packaging of tank cylinders is laterally in order to make the cylinders and plumbing accessible and serviceable.

Configuring the tanks or tank modules laterally in the enclosure allows the tanks to be inserted and removed from the side via a removable protective panel. This also allows servicing of the tank plumbing and valves from the side of the locomotive. The tanks or tank modules can be removed individually without removing the entire enclosure from the chassis. This is important as the tank cylinders pressure vessels that are likely going to need removal for periodic hydro static requalification testing at every 4 year locomotive maintenance cycle.

The enclosure is scalable to work with various widths, heights and lengths allowing the use of tanks in various sizes and types from off the shelf 16" diameter 3600 psi Type 3 tanks such as those made by Structural Composites Inc, to custom tanks with specific geometric or performance features such as Siamese LNG tanks that further increase total NG storage capacity. For example, a 2-pack CNG tank module using 3600 psi Type 3 tanks of 85" and 105" standard length respectively would hold approximately 36 diesel gallon equivalent (DGE) of CNG. With higher pressure 4500 psi tanks made to specific lengths (101" and 110") to fit this enclosure, each 2-pack of tanks would then hold 33% more CNG, ~50 DGE, in the same amount of space.

The second portion of the summary relates to a CNG cylinder module that can be inserted into an underframe CNG enclosure. For the under frame NG storage within the enclosure, the most efficient packaging for the tanks is a multi-cylinder tank module. The tank modules can be sized, stacked, or joined in a package to fit within a specific enclosure or mounting frame. The enclosure or mounting frame is scalable and sized to accept one or more tank modules. The tank modules are standalone, removable, serviceable, replaceable and can be mounted alone or in multiples contained within an enclosure. The module concept optimizes tank integration and configuration to maximize available storage volume.

For CNG applications, the tank module(s) are integrated into the underframe enclosure. In a typical switcher there is approximately 7 feet of space between the axle trucks so longitudinal tanks would be shorter than 7 feet. When tanks are stored laterally in a switcher, they are both longer and removable from the side. If the switcher tanks had been installed longitudinally there would have been 11 tanks and they would have been 7 feet long. A typical SW1500 switcher would use an enclosure module with 4 or 5 two pack tank modules oriented laterally as previously described resulting in up to 250 DGE of CNG on board the switcher.

The novelty of the integrated design of the CNG tank module and the enclosure allows the physical presence of the CNG cylinders to structurally enhance the enclosures ability to absorb vertical crushing loads during locomotive derailment events. This is done by having some part of the CNG cylinder module prevent the lateral motion of the vertical walls of the enclosure when they attempt to buckle. It only takes a small lateral force to keep the wall from buckling, this lateral force could be 1/100th the vertical force trying to crush the structure. If the module did not serve this function, the vertical walls would need to be much thicker and heavier increase the enclosure cost and weight while reducing the room for additional CNG cylinder modules.

The third portion of the summary relates to a CNG tender car frame. What is proposed is using these cylinders in a novel configuration to maximize the amount of CNG storage in a railroad fuel tender car while increasing the safety of the design. By splitting the car with a structural bulkhead, it makes the tender car able to sustain side impact collisions better at railroad crossings. This is because the structural bulkhead will solidly tie the two sides of the rail car together.

This sectioning of the car also allows the CNG cylinders for a 76' long car to be made by existing companies such as Lincoln Composites on their existing tooling as the longest tank in the car will be 33 feet long which is shorter than their current 38 foot standard Titan tank. It is practical for a manufacturer to make shorter tanks on existing tooling, but longer tanks would require newer tooling and possibly a newer process.

The fourth portion of the summary relates to an intermodal well car based LNG tender tank module. If an ISO Tank module is going to be used in an intermodal well car as a locomotive fuel tender, there will be an issue with side impact protection from vehicles at crossings. The well car has thin side walls to fit through tunnels and it has to surround a box at least 40' long and up to 53' long. This long thin wall will collapse easily if struck from the side by a vehicle at railroad crossings.

A simple solution to this issue is to incorporate a structural bulkhead into the ISO container that connects the ISO mount frame to the outer pressure vessel wall of the tank. By connecting to the outer wall of the pressure vessel, the circular tank material acts in a similar manner to a bridge arch and forms a very strong structural element for absorbing loads acting in the plane of the bulkhead. In a side impact, the wall of the well car will still collapse somewhat, but it will then contact this bulkhead which is connected to the opposing wall of the enclosure module. In order for the first wall to continue collapsing, the entire ISO module must start to bend if the structural bulkhead wall does not itself collapse.

The fifth portion of the summary relates to plate mounting of large Type 4 CNG cylinders. Proposed here is a plate mounting system to replace both the pin and the strap mounting systems common to Type 3 and Type 4 CNG cylinders.

For the locomotive application this solves the issue of trying to use mounting straps in the very close confines of a tight fitting crashworthy enclosure. It also eliminates all the issues with the use of pin mounting in rail applications.

The large mounting pilot close to the surface of the CNG cylinder shell eliminates what would be a large torque load on the CNG cylinder end pin during coupling loads or a train collision. Also the larger pilot allows for a central cavity on the cylinder cap to be used to recess the valves and fittings so that the cylinders are more crash worthy and allow addition circumferential volume at the end of the tank for higher fuel storage capacity.

The pilot also eliminates an issue of pin and pocket wear from the slip fit, this is an issue on locomotives due to the steel wheel on rail vibration and long life expectancy of rail equipment, exceeding 40 years in some cases.

This concept was conceived with a focus on 34" diameter tanks as the optimum sized for underframe CNG cylinders for locomotive applications. Once developed it is appropriate for other smaller and larger Type 4 cylinders applications. These applications could be outside of the rail industry; example applications include marine, on road truck and bus, or off-road mining trucks.

In this embodiment is used a metal tank insert on each end of a Type 4 CNG cylinder. The pilot feature described could also be incorporated into a Type 3 metal tank liner when it is formed. This would allow a Type 3 CNG cylinder the benefit of a longer tank and a flexible plate mounting system. In this case a separate valve body can be installed inside the perimeter of this pilot material. It would most likely be retained by bolts and sealed with an O-ring. On larger Type 3 tanks, the threaded port hole could be opened up from the standard 1.125-12 thread to something larger. Into this threaded area a valve body could be threaded that does not have a protruding handle, a female socket or special male tool shape would be inserted to rotate and operate the shut off valve. As in the Type 4 tank configuration, it is intended that the valves and plumbing for the cylinder be recessed and protected from contact with collision damaged structure around the tank end.

The sixth portion of the summary relates to vertical Siamese LNG tank modules. In order to address the packaging opportunities corresponding to NG storage on hybrid tender cars or other natural gas fuel applications where storage footprint is limited, described here is an LNG tank module that can be configured to fit most any installation space and orientation using a Siamese construction for the inner pressure vessels.

The tank module is a fabricated a vertical two section siamese tank consisting of two cylindrical tanks cut longitudinally off center from the center axis and welded together on either side of a common plate. This LNG tank module design better fits the tender car profile which is 10 feet wide and 16 feet tall. With an even thinner tank system in the lateral direction this LNG module design will leave additional space on each side of it within the tender car.

The additional space on each side would address one problem with existing LNG tank cars used as locomotive fuel tenders, because the tank cars are so tall and wide, there is no way for a locomotive crew member to safely walk from one locomotive to another when a locomotive is connected to each end of the tender. Also this extra side clearance makes the LNG module and tender car more crashworthy with more rail car structure and additional space for that extra structure to deform during an accident.

A further advantage of the extra space on each side of the LNG tank module is its availability as ducting space for a potential ram air cooling system for the locomotives. The energy saved by allowing ram air cooling and waste heat recovery is like adding 15% more fuel storage capacity at the same time the fuel cost is reduced by 15%. Further, instead of the tender car taking up the space of a potential locomotive, it just created 30% of one locomotive in unused powered cooling fan power and recovered waste heat energy.

The seventh portion of the summary relates to a locomotive underframe Siamese LNG fuel storage system. An alternate embodiment on the Siamese LNG tank module construction addresses a remaining opportunity to maximize the fuel density for underframe storage on the locomotive. The larger distance between the trucks on passenger and freight locomotives allow sufficient length to mount tanks longitudinally under the locomotive frame instead of in a separate tender car. Since regulations and performance requirements for LNG tanks are different than for CNG cylinders, the structural, access and maintenance requirements are different as well. The LNG storage requirements lend themselves to expanding the Siamese tanks module into a multi cylinder tank enclosure. The cylinders become part of the enclosure structure to absorb and/or transfer loads allowing the enclosure to meet the crashworthiness requirements with a minimum of external structure added to do so. The Siamese enclosure is fabricated similarly to the Siamese tank module by orienting the cylinders horizontally and adding split plates and additional cylindrical shaped sections to create a single large LNG volume tank that spans the length and width of the underframe cavity on the locomotive.

By creating a single LNG pressure vessel with multiple cylindrical shaped sections sharing common walls, a conformal pressure vessel can be formed that maximizes the amount of pressurized liquid or gaseous fuel can be stored in a rectangular shaped area such as the 10 foot wide and 3 foot tall space under the locomotive. In the case of the locomotive underframe area, four 28" diameter tanks can be made with 3 shared walls to fit in the same space that only 3 independent tanks would for increased capacity.

Further this one pressure vessel instead of 3 independent vessels reduces the amount of shut off valves, plumbing pipes and fittings by two thirds; drastically reducing cost, complexity and failure points. This also greatly reduces the heat leak due to plumbing because there are only two penetrations through the vacuum insulation cavity instead of six. Heat leak is also reduced due to the shared walls and the fact that ratio of volume compared to surface area that can absorb radiated heat is increased by fifty percent or more compared to individual tanks.

The vertical shared walls also provide a good load path for the vertical crushing loads the tank must be able to withstand during a derailment. The vertical shared walls are further reinforced from bucking by having multiple internal tank baffles welded to them.

The use of movable support plates with the outer supports at opposing angles allows the inner Siamese pressure vessel to be vertically and laterally supported and located by only 6 contact points. These mounts will also be the load path that takes the vertical crushing load from the bottom of the tank and transfer it through the shared siamese pressure vessel walls to the enclosure top surface and the lower surface of the locomotive frame.

The eighth portion of the summary relates to an LNG pump module. The Siamese LNG tank module and underframe Siamese LNG Enclosure module can be used in an existing passive LNG vaporizing system, but in order to fully realize the fuel density potential and ease of infrastructure adaption, the LNG pump module (LNGPM) should be included as well.

The LNG pump module concept is for a relatively small, self-contained fuel delivery system for use with LNG that can provide a moderate pressure rise of up to three hundred psi over a flow range of 0.2 to 4.0 GPM. The module's ideal operating temperature range is from −100 to −200 degree Celsius and it is scalable and adaptable to different applications to maximize the opportunities for natural gas fueled vehicle The LNG pump module (LNGPM) is an active system that does not rely on vaporization of the natural gas to generate the fuel system pressure or manage the remaining gas in the tank. Instead the module draws the LNG from the tank at a temperature and pressure much lower than that required to by the fuel system. The LNGPM then pressurizes the LNG to a required level and delivers it to the fuel system at a low temperature and high density. Maintaining and supplying the natural gas in a low temperature, high density state to the fuel management system provides several benefits. The system does not require the LNG vaporization to generate the fuel pressure; the LNG can be maintained at temperatures and pressures much lower than the vaporization point allowing both increased density and longer storage time in tank. Supplying the natural gas at an elevated pressure and low temperature also provides the benefit of defining where and at what pressure the natural gas vaporization occurs and addresses issues with pressure variations currently experienced in the NG vaporization and delivery systems downstream from the storage system The LNGPM is to be externally powered and controlled. The controller is software configurable and will provide the necessary voltage and frequency for variable speed and load operation based on sensor and system commands inputs. This will allow the LNG Pump Module to be quickly adapted to a specific application allowing the transfer of LNG from the tank(s) to the engines fuel management system on demand at the necessary flow and pressure.

The ninth portion of the summary relates to an underframe CNG Enclosure using Jumbo Type 1 cylinders. Proposed is Type 2 CNG cylinder design using ultra high tensile strength wire wrapping instead of the typical carbon fiber wrapping. This is effectively an all metal design with improved fire tolerance. This will be similar to the previous stacked CNG cylinder enclosure design in that the CNG cylinder surface is in some way used to prevent the tall slender vertical walls from buckling. In this case the cylinder is still used to keep the walls from bucking, but also the walls could be used to keep the cylinder from buckling or deforming significantly when the vertical jackknife derailment loading is placed under the cylinder instead of under one of the enclosure walls. In this enclosure design the CNG cylinder will sit directly on the thin plate floor of the enclosure with no stiffening structure below it. Under the conditions of both low CNG storage pressure and high vertical loading on the enclosure floor concentrated under the centerline of the CNG cylinder, the CNG cylinder may deform into a shorter oval shape. At this point the one or both sides of the CNG cylinder will displace outward until the small gap between them and the vertical walls is taken up, at this point the vertical walls of the enclosure are now helping to prevent the CNG cylinder from vertically collapsing further, thus helping support the vertical load applied to the bottom of the enclosure.

Under the cylinder could also be incorporated a metal protective saddle. If a sharp object were to press up against the bottom of the enclosure, this saddle would spread the load. The saddle is not needed for contact between the top or sides of the cylinder and the enclosure as the walls and roof of the enclosure would contact as a flat smooth surface.

This saddle could also have a stepped keying feature that would engage the vertical gussets if they were pushed up with a section of the floor. If the stepped keyed feature was not there, the corner or an edge of the vertical gusset could contact the wire winding of the side of the cylinder and weaken it locally.

By using a metal protective saddle that conforms on one side to the Type 2 wrapping, the cylinder could be placed directly on the floor of the enclosure with a very small gap on the top. On the open end of the enclosure when the cylinder is installed, a flexible bar could be used to push against the cylinder dome end at an angle either up or down. With a corresponding flexible bar built into the closed end of the enclosure, the cylinder could be firmly mounted and yet the pair of flexible bars would still allow the cylinder to expand axially and in diameter as it is filled. Only one of the two ends needs to be flexible. Axial expansion of a Type 2 cylinder of this length and high pressure would be close to 0.1 inches so this mounting system does have to allow for expansion. On the installation end, the structure pushing against the cylinder could be installed on the removable door instead being attached to the enclosure structure. Also, one or both of the cylinder contacting fixtures could be adjustable. This allows for manufacturing tolerances and also for setting a specific spring preload that both adequately restrains the cylinder from moving when subjected to train coupling shocks and vibrations, but also allows for the previously described axially expansion when pressurized.

A further variation on pushing the cylinder down into the floor or up into the enclosure roof is to have the cylinder restraint system push against the cylinder end dome at a compound angle that pushes the cylinder against two surfaces at the same time. One vertical surface and one horizontal surface.

Another optional feature of CNG cylinders designed for this application is to make the cylinder ends 'neckless' without a protruding neck, these cylinders could be closed at both ends similar to the bottom on some conventional Type 1 high pressure cylinders. Removing the cylinder end neck allows the fatter part of the cylinder to be even longer allowing for more gas storage in the limited side to side space of the locomotive profile.

Another improvement to the 'neckless' cylinder is to offset the porting from the end of the cylinder to further around on the side of the curved surface of the cylinder dome end. This adds to both crashworthiness as the natural gas fittings are at less risk of physical damage in an incident, and it further increases storage potential as the axial length the fittings would have taken up is now added to the fat portion of the cylinder. It is the ends of the cylinder most likely to be struck in an accident serious enough to deform the enclosure storing the cylinders. By moving the port away from the cylinder end this risk is reduced. In the locomotive underframe application the fuel cylinder enclosure gets wider toward the top. If the protected port is at or moved above the center line of the CNG cylinder, it is further away from the enclosure outer surface, further increasing its protection from being struck by an external object deforming or penetrating the CNG cylinder enclosure.

The tenth portion of the summary relates to improvements to filament wound Type 2 high pressure gas cylinders. The weak spot at the tangency point can be fixed by either finding a way to extend the full thickness of the wire wrap past it or thickening the liner material through it or a combination of both.

Extending the wire wrap is the optimal solution using today's cylinder liner spin forming tooling and can be done simply by having a blocking wall surface protruding up from the dome surface that the wire wrap thickness is extended to.

This wall can also be built up with some new spin forming process from liner material already there, it can also be deposited by any number of deposition processes including build up using a welding process and filler material compatible with the liner. The most promising way to accomplish the blocking wall without significant tooling investment is to braze it to the cylinder dome as a separate piece of material in the form of a blocking ring.

The eleventh portion of the summary relates to a combined venting system for underframe CNG enclosures. In the application of CNG systems to locomotives, there will be an effort to store high pressure CNG cylinders underneath the locomotive frame. It is likely these cylinders will end up inside of an enclosure used to make them resistant to physical damage or more 'crashworthy'. As the locomotive enclosure will be a large weldment of many parts and in service for up to 30 years, it is impractical to design the enclosure to be air tight.

There will be a temperature and pressure sensitive pressure relief system installed to prevent catastrophic failure of any of the cylinders due to high temperature and over pressure. These will be combined and vented to a roof location above the locomotive.

What is proposed is to have this combined vent tube run inside of another larger vent tube that any small plumbing leak in the enclosure would force gas through. With the smaller PRD combine vent pipe ending short of the end of the larger outer duct, two advantages will be attained.

One methane sensor could be used after this mixing point to sense either a methane leak in the combined PRD system or an overall leak in any of the fittings between the PRD fitting and the high pressure gas feed pipe exiting the enclosure.

The second advantage of this system is that in the case of the PRD's being activated, the exiting high pressure gas through the PRD pipe will merge with the gasses in the larger duct forming a jet pump. This will act to insure that the enclosure cavity is under a low pressure and will not be expelling natural gas through gaps in the enclosure structure

DESCRIPTION OF THE DRAWINGS

FIG. 2A is a side view of the Crashworthy Underframe CNG Storage System with 2 of the 4 CNG cylinder modules removed. This view illustrates the tall slender vertical walls and the vertical wall gussets that have to absorb the vertical crushing loads when a derailed locomotive would be resting on the bottom surface of the CNG enclosure.

FIG. 2B is a detail view of FIG. 2A Illustrating the contact point where the CNG Module has a feature that helps to prevent the vertical wall from buckling under high crushing loads.

FIG. 4A is an isometric exploded view of a Crashworthy Underframe LNG Storage System illustrating the assembly of the Siamese LNG pressure vessel into the Crashworthy Enclosure. The Siamese LNG pressure vessel would be slid into and supported inside the crashworthy enclosure on 6 movable supports and the end plate would then be welded to the enclosure completing the assembly.

FIG. 4B is a Detail View of FIG. 4A illustrating the LNG feed pipe and the vent pipe attachment to the Siamese LNG pressure vessel.

FIG. 4C is a Detail view of FIG. 4B illustrating movable support contact piece and its thermal insulating support where it rests upon the outer surface of the Siamese LNG pressure vessel.

FIG. 5A is a cross section view of the Crashworthy LNG Storage System illustrating the relationship between the Siamese LNG pressure vessel, the Crashworthy Enclosure and the 6 movable supports.

FIG. 5B is a Detail View of FIG. 5A illustrating in more detail the components and internal structure that support and locate the 6 movable supports.

FIG. 6A an isometric view illustrating the shared Siamese walls and the baffle plates that make up the internal support structure of the Siamese LNG tank.

FIG. 6B is a detail view of FIG. 6A and illustrates the direct load path of the angled movable support feature directly into the shared Siamese wall of the Siamese LNG pressure vessel.

FIG. 7A is an isometric view illustrating the Siamese LNG pressure vessel and the support structure that interfaces with the movable support plate that vertically supports it.

FIG. 7B is cross section view from the end of the Vertical Siamese LNG Tank Module illustrating the movable plate supports that vertically support the Siamese LNG pressure vessel inside.

FIG. 13A is a side view of a locomotive illustrating a LNG storage system with an attached LNG pump module.

FIG. 13B is a detail view of FIG. 13A further detailing the LNG pump module components.

DETAILED DESCRIPTION OF THE INVENTION

Figure 1:
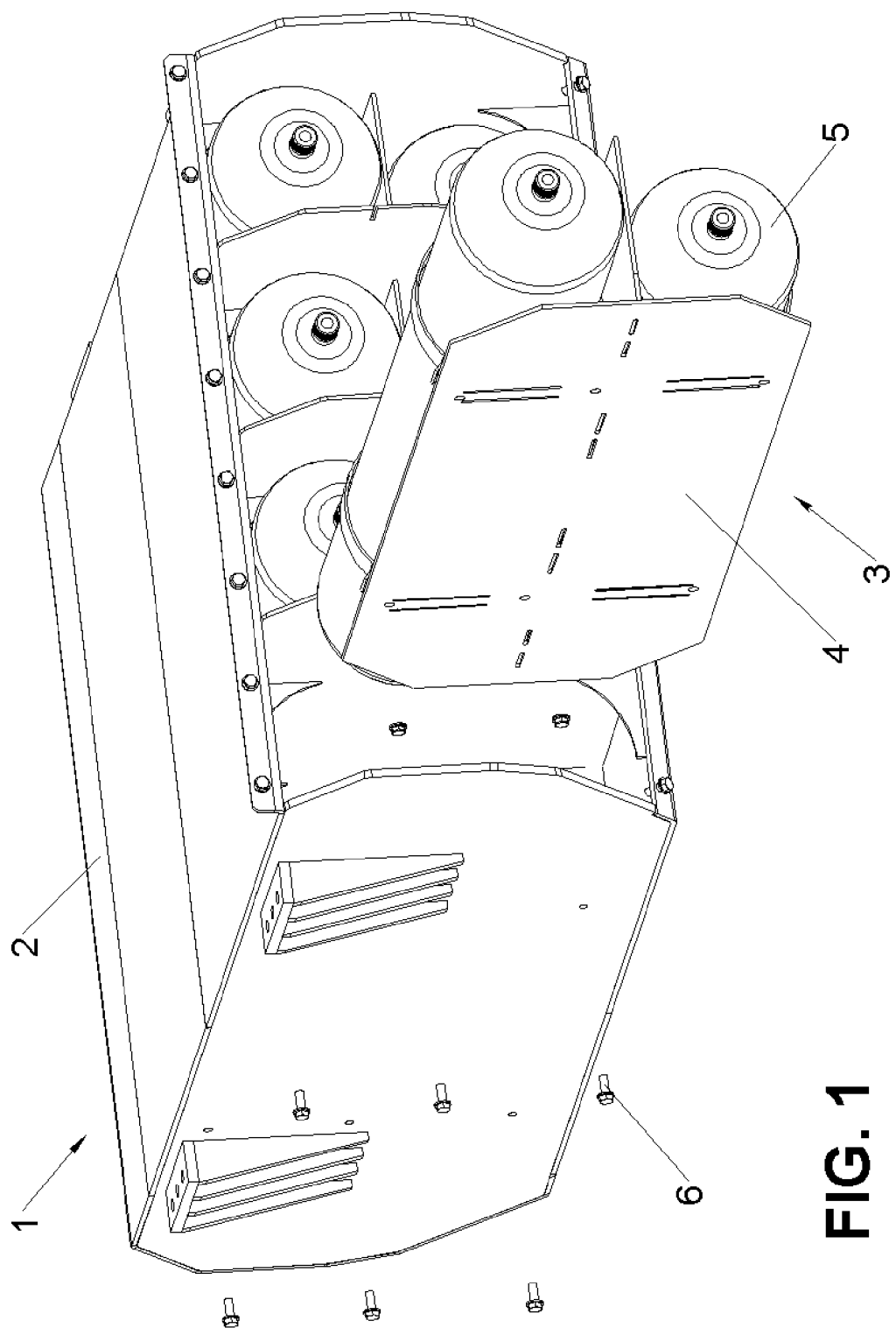
FIG. 1 is an isometric view of the Crashworthy Underframe CNG Storage System, containing four 2 cylinder tank modules illustrating the integration and packaging of the system for locomotive underframe mounted applications.

FIG. 1 illustrates a CNG storage system 1 that is composed of one Crashworthy Enclosure 2 and at least one CNG cylinder module 3. In this embodiment, CNG storage system 1 incorporates four CNG cylinder modules 3.

The Crashworthy Enclosure 2 is a semi monocoque structure configured in such a way as to withstand and/or distribute external loads allowing it to meet the structural and crashworthiness requirements while maintaining the integrity and maximizing the storage volume of the cylinders within it.

Because the CNG cylinder modules 3 have combined plumbing that can be accessed from one side, it allows the Crashworthy Enclosure 2 to have one removable side panel and one permanent side panel. This permanent side panel is welded in place and offers more structural rigidity than the removable side panel on the opposite side from it. This will either add strength or allow thinner and lighter materials to be used in the enclosure structure.

In FIG. 1 Crashworthy Enclosure 2 is shown with its removable door not present in order to illustrate removal of CNG cylinder module 3. As removable door panels are common in the art of enclosures no further discussion is needed.

FIG. 1 further illustrates the removal of CNG cylinder module 3. Also visible are six bolts 6 that are used to retain each CNG cylinder module 3 to the Crashworthy Enclosure 2. Less or more than six bolts 6 may be needed for CNG cylinder module 3 retention depending on the particular design.

FIG. 2A is a side view of the CNG storage system 1, again with the removable side panel missing from Crashworthy enclosure 2. In this view the 2 left CNG cylinder modules 3 are removed. Because this embodiment of crashworthy enclosure 2 can hold four CNG cylinder modules 3, there will be 3 thin vertical walls 9 and two outer thicker vertical walls 9'. Also visible are gussets 8 that help support the top and bottom of the thin vertical walls 9 by shortening their center span where the thin material can easily deflect and the thin vertical wall 9 can buckle allowing crashworthy enclosure 2 to collapse.

Each CNG cylinder module 3 will have its own set of six bolts 6. When bolts 6 are in place they offer additional stiffness to the thin vertical walls 9 to help prevent buckling. This could allow the fixed vertical walls 9 to be made from thinner material.

FIG. 2B is a detail view of FIG. 2A. It illustrates the anti-buckling contact point 10 where the horizontal plate of the CNG module frame 4 is in close proximity of the neighboring vertical wall, either thin vertical wall 9 or thicker vertical wall 9'. This helps to prevent any of the vertical walls from buckling by connecting them together along this plane formed by the CNG module rack 4 horizontal plates.

Figure 3:
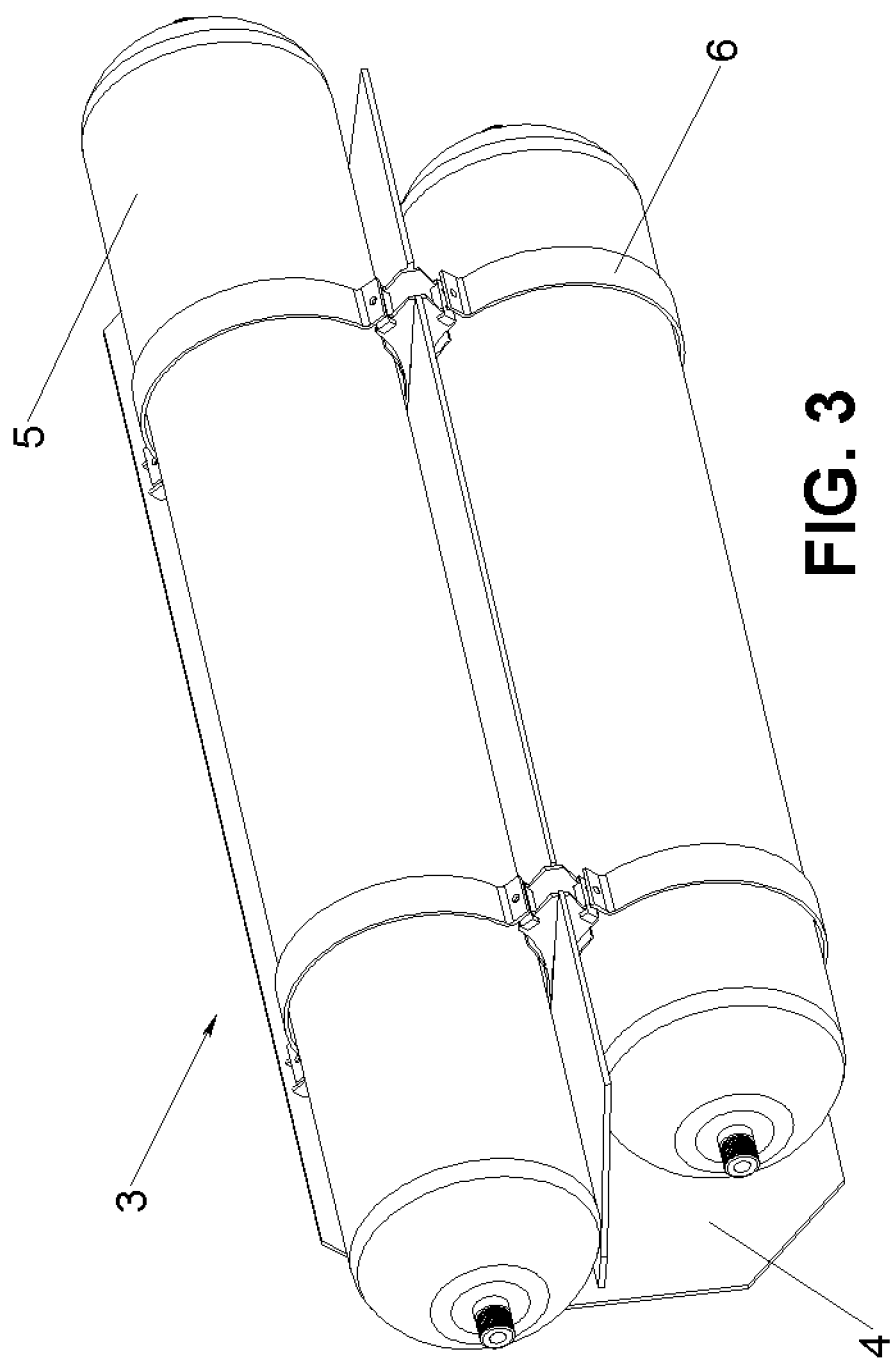
FIG. 3 is and isometric view of the CNG cylinder module illustrating the individual CNG cylinders and the straps that retain them to the CNG cylinder module frame.

FIG. 3 Illustrates a CNG tank module 3 that contains two CNG cylinders 5 mounted to the module frame 4. Visible are the tank mounting straps 6 that are installed at a 45 degree angle for compactness. It is apparent that the fasteners required to attach straps 6 would be challenging to manipulate if the module frame 4 was permanently installed into crashworthy enclosure 2. In that case the spacing between thin vertical walls 9 would need to be several inches greater.

In this embodiment the CNG tank module 3 contains a pair of CNG cylinders 5. CNG tank module 3 can be composed of 1 or more CNG cylinders fixed to the module frame 4 in such a way as to make the CNG tank module 4 compatible with and mountable in a crashworthy enclosure.

The removable CNG tank module 3 has several advantages besides providing an efficient use of space while still allowing service access to the tanks:

The primary advantage is structural as the vertical stacking of the pair of 16" or 17" diameter CNG cylinders 5 allows a vertical structural wall 9 every 18" or so. These vertical walls of the frame allow the enclosure to withstand the crushing loads that the tank would suffer in a derailment without the larger vertical load passing through and possibly compromising the CNG cylinders 5.

The plumbing can be significantly simplified, as both CNG cylinders 5 in each CNG cylinder module 3 can be plumbed on the rack to one high pressure outlet fitting and one vent fitting. During a CNG cylinder module 3 installation and removal only the single pressure and vent line need to be connected or disconnected in the field.

Each pair of CNG cylinders 5 could be connected to a single PRD valve with a pair of temperature sensors on each rack FIG. 4A illustrates a possible underframe locomotive LNG tank system that is crashworthy, simple and high capacity. In this design siamese pressure vessel 33 is slid into crashworthy enclosure 35 on six movable supports 34. After that end plate 32 is welded into place becoming an integral part of crashworthy enclosure 35. This creates a vacuum insulation cavity between the crashworthy enclosure 35 and siamese pressure vessel 33.

FIG. 4B is a detail view of FIG. 4A illustrating LNG feed pipe 41 and vent pipe 40 which are both welded to siamese pressure vessel 33. In this embodiment both of these are corregated for flexibility. When end plate 32 is welded to crashworthy enclosure 35, end plate 35 is also welded to LNG feed pipe 41 and vent pipe 40. These two metallic pipes are the only non insulated direct heat path between the siamese pressure vessel 33 and the crashworthy enclosure 35. If the tank system had 3 independent tanks, there would be 6 of these heat paths instead of 2.

FIG. 4C is a detail view of FIG. 4B illustrating one of the 6 mounting points for the siamese pressure vessel 33. In direct contact with the surface of the pressure vessel 33 is an insulator block 42, and captured inside insulator block 42 is support pivot 43. Insulator block 42 is captured by locating features on siamese pressure vessel 33 and is made from some hard but insulating material such as resin impregnated phenolic cloth. Support pivot 43 will be subject to a concentrated load so it is likely to be made of a metallic material such as steel.

FIG. 5A is a cross section view of the tank assembly. Inside of siamese pressure vessel 33 are 3 shared vertical walls 36 and multiple baffle plates 38.

FIG. 5B is a detail view of FIG. 5A illustrating one of the six movable supports 33 and the components that locate and transmit load through it. Directly contacting each end of movable support 33 are support pivots 43. Capturing each support pivot 43 is an insulator block 42. This set of components is designed to transmit load with a minimal transfer of heat between the siamese pressure vessel 33 and crashworthy enclosure 35. There is a set above and below siamese pressure vessel 33. There are also four angled sets of these parts that not only transmit vertical force, but due to their opposing angles, they locate siamese pressure vessel 33 laterally inside of crashworthy enclosure 35.

The pressure induced stresses in siamese pressure vessel 33 are carried by arched plates 37 that make up the exposed surface of pressure vessel 33 and by the vertical plates 36 which are shared by the neighboring siamese pressure chambers. Due to geometric conditions inherent in pressure vessels shared, vertical wall 36 should be at least twice the thickness of arched plates 37. The vertical load paths created by movable supports 3 are transmitted to pressure vessel 33 and carried through the pressure vessel 33 by the shared vertical wall 36.

FIG. 6A is an isometric view of the internal structural components of siamese pressure vessel 33. This illustrates how multiple baffle plates 38 will help prevent the 3 shared vertical walls 36 from buckling when subject to the very high vertical loading forces during a derailment accident. This is when the locomotive has derailed and the locomotive fuel tank bottom is resting on a piece of track rail and supporting the weight of the locomotive.

FIG. 6B is a detail view of FIG. 6A illustrating how the vertical load path generated by an angled movable support is still transmitted directly through a vertical wall 36.

FIG. 7A is an isometric view of a siamese pressure vessel 51. There is a shared wall 54 in the middle of the two siamese cylindrical pressure vessels that form one pressure vessel cavity. Shared wall 54 will have holes in it that connect the two cylindrical pressure vessel shapes into one sealed pressure vessel cavity. Support pivot 55 runs along the bottom sides of Siamese pressure vessel 51. Support pivot 55 may be made up of multiple components so that is can absorb a concentrated vertical load as it support the weight of the siamese pressure vessel 51 while transferring as little heat as possible.

FIG. 7B is an end view of the Vertical Siamese Tank Module 50. Shown are the main vertical supports 53 that vertically support the weight of the siamese pressure vessel 51. Around siamese pressure vessel 51 is the outer pressure vessel 52. In between siamese pressure vessel 51 and outer pressure vessel 52 is a vacuum cavity needed to keep the cryogenic LNG liquid from boiling off too rapidly.

Movable support 53 support contacts support pivot 55 and transfers the weight of siamese pressure vessel 51 to the outer pressure vessel 52 which is then attached to the rail vehicle that the Vertical Siamese Tank Module 50 is installed in. Not shown are other structural connections between the siamese pressure vessel 51 is the outer pressure vessel 52 that will absorb the axial and side loading on the tank and help the outer pressure vessel 52 maintain its shape. These supports will typically be placed in a direction normal to the outer pressure vessel 52 wall and will be much smaller in cross section and offer less of a heat leak potential. These standard lightly loaded supports are common in the art and not detailed here.

Figure 8:
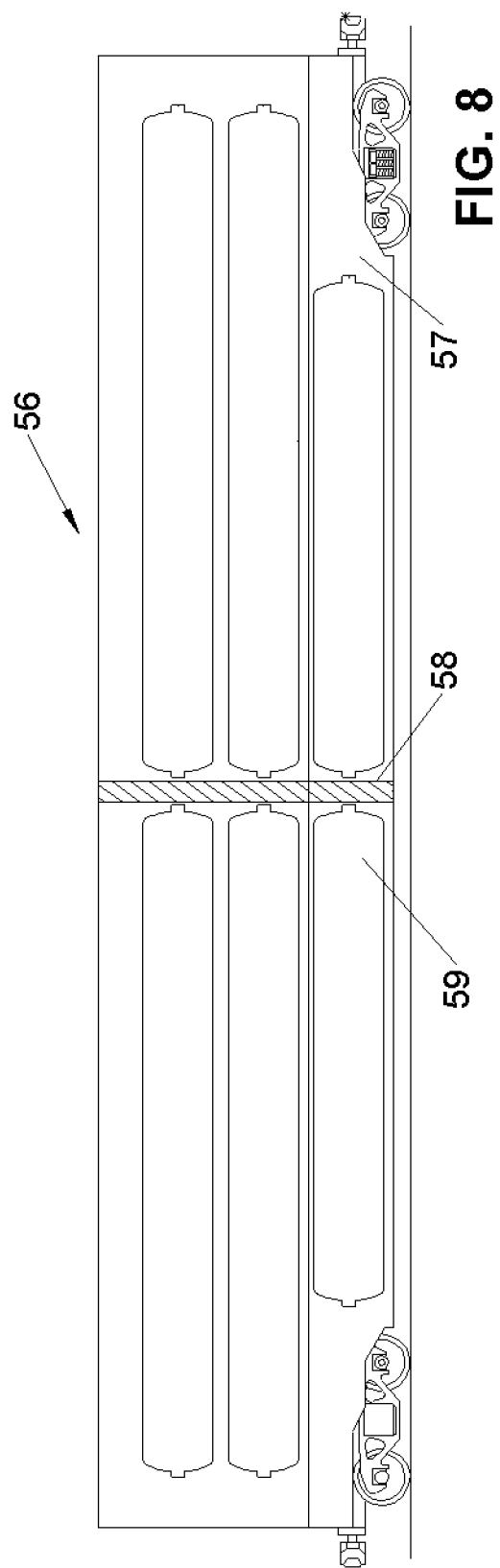
FIG. 8 is a side view of a high capacity CNG tender car with a structural center bulkhead.

FIG. 8 Illustrates a side view of CNG tender car 56. In this embodiment CNG Tender car 56 is built upon a rail car 57 with a structural bulkhead 58 in the middle. Rail car 57 is similar in construction to an intermodal well car in that it has long slender walls that maximize internal volume for installing cargo or equipment while providing the axial structure needed to transmit the axial coupling loads of a railcar in a train. Bulkhead 58 will connect the left and right walls together to stiffen the long slender side walls by cutting the effective length in half. This adds significantly to the crashworthiness of the CNG tender car 56. For fuel storage crashworthiness, FRA regulations require that a locomotive fuel system be able to withstand a side impact from a class 8 truck.

Bulkhead 58 also supports one end of each CNG cylinder 59. In the preferred embodiment, each CNG cylinder 59 would have a fixed mount at bulkhead 58 and a sliding mount at the opposite end of the CNG cylinder 59. This sliding mount allows the CNG cylinder 59 to expand axially act as it is filled to a high pressure.

This embodiment of CNG tender car 56 contains twelve CNG cylinders 59. The upper 8 would be approximately 33 feet long and the lower four would be 25 feet long.

It would be possible to make these tender cars using Lincoln's standard 38 foot tanks replacing the 33 foot tanks in a longer rail car. Modern diesel electric locomotives have been produced up to 98 feet in length. This would add an additional 16% of fuel storage at a tender car length of approximately 85'

With the larger diameter CNG cylinders designed for 4500 psi operating pressure, the tender car will be capable of storing 10,000 DGE of CNG fuel. This is only ⅔ of what an LNG rail car can carry, but is enough fuel to get two main line freight locomotives the distance they can now travel on their existing diesel tanks Currently the larger mainline diesel electric locomotives carry 5000 gallons of diesel fuel. As the railroad industry converts to natural gas over the next few years it will be using dual fuel locomotives that can only consume 50-70% natural gas so it would be capable of taking 3 or 4 locomotives the full distance on natural gas and would still have at least 30% of its diesel fuel remaining.

Figure 9:
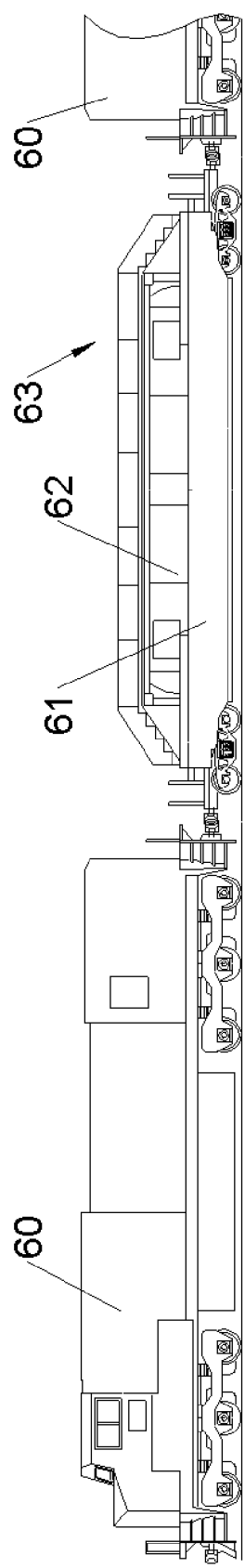
FIG. 9 is a side view illustrating a crashworthy LNG tender car built from a modified ISO intermodal cryogenic tank and intermodal well car.

FIG. 9 illustrates a locomotive consist with two locomotives 60 connected to an LNG tender car 63 that is built from a conventional intermodal well car 61 with a modified intermodal tank module 62.

Figure 10:
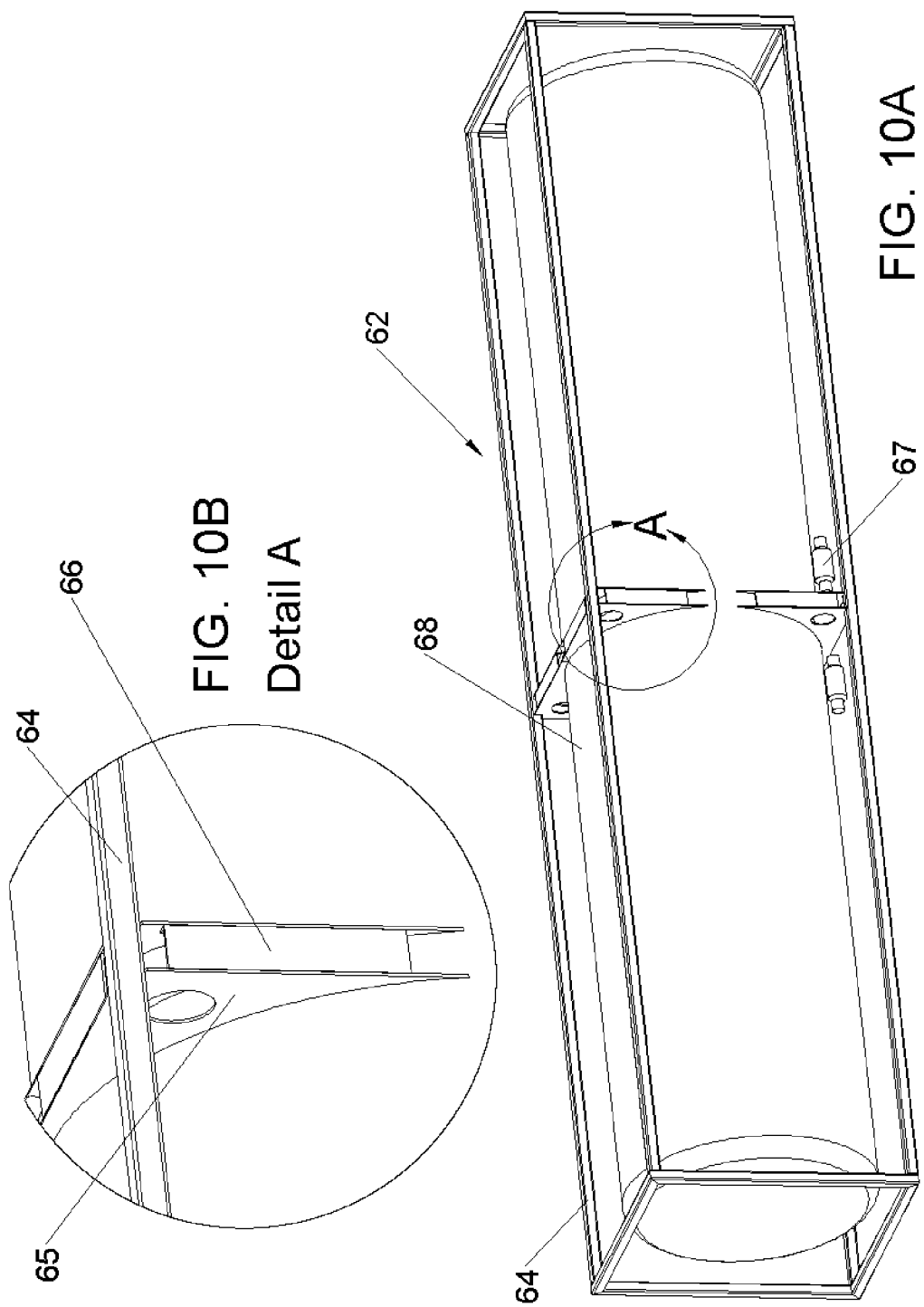
FIG. 10A is an isometric view illustrating the ISO LNG tank module with its structural improvements and optional LNG pump installation.
FIG. 10B is a Detail view of FIG. 10A further detailing the minor structural improvements to the standard ISO Intermodal cryogenic tank.

FIG. 10 illustrates an ISO intermodal tank container modified for LNG tender car service. ISO LNG module 62 is built from an ISO intermodal tank container and modified for crashworthiness by incorporating a structural feature that acts as a bulkhead. This structural feature connects the outer frame structure 64 to the outer pressure vessel shell 68.

with the structural bulkhead added. In this case there is only one bulkhead added at the center of the tank. In some cases there may be multiple bulkheads used to create even shorter zones for the side wall to resist buckling.

FIG. 10B illustrates a preferred embodiment of the structural bulkhead feature; it could be constructed from steel plates 65 and steel c-channel 66. These components would be welded to both the outer frame structure 64 and the steel outer pressure vessel 68. There are many different ways this bulkhead could be constructed, this is an economical and practical one.

Another embodiment is to add another metal hoop of steel around the tank that fits close to the outer pressure vessel shell 68. This second hoop may or may not be welded to the outside of the pressure vessel. The bulkhead could be welded to this hoop instead of the outer wall. In any case the outer wall of the pressure vessel is still acting as a structural element as it prevents the second hoop from collapsing.

It is the structural bulkhead feature utilizing the outer pressure vessel wall as part of its structure that makes this unique. This allows the structural bulkhead feature to act as a virtual solid wall without passing any of the potential side impact loads to the more critical inner pressure vessel that contains the hazardous LNG fuel.

Figure 11:
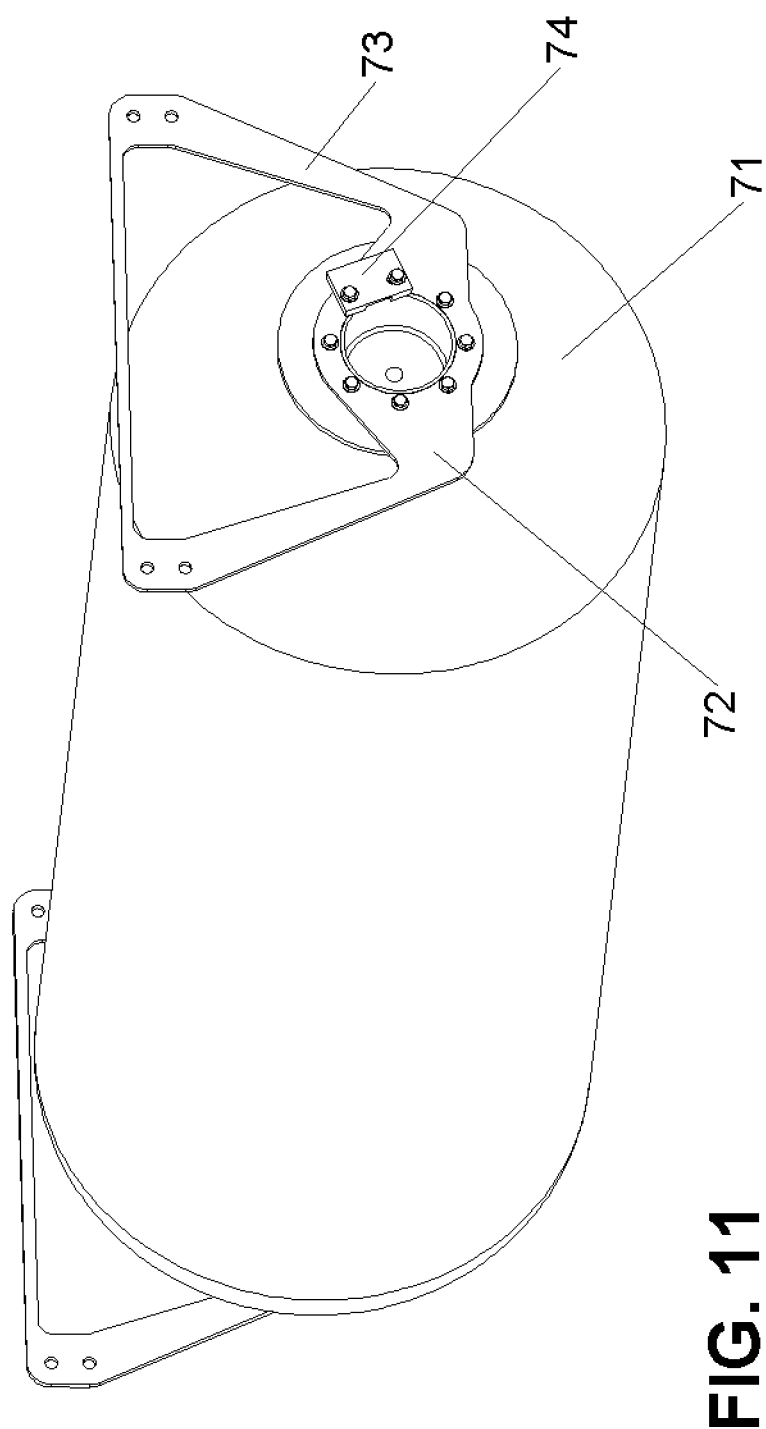
FIG. 11 is an isometric view of a large Type 4 CNG cylinder with a recessed end cavity, pilot and plate mounting arrangement and a protective cover for the fuel line. A system which both increases safety and storage capacity.

FIG. 11 Illustrates a Type 4 CNG cylinder 71 with a mounting plate mount 72 at each end. The mounting plate 72 act as springs allowing the CNG cylinder 71 to expand and contract without the need for a sliding surface. The mounting plates 72 could have tapered spring arm sections 73 designed as depicted. These would offer the appropriate lateral stiffness needed to handle vehicle side loads, but would minimize the torque load applied to the CNG cylinder 71 metal tank insert when the mounting plates 72 flexed. The mounting plates 72 will have to flex when the tank grows in length during filling or contracts as it is emptied.

Also visible is a CNG fuel line protector 74.

With the tank pilot and mount plate design it is possible to minimize or eliminate the exposure of the CNG lines and valves past the end of the CNG cylinder and its mount structure. This embodiment of the CNG line protector will cover an exiting CNG line as it crosses the pilot at the end of the tank. Once it crosses this area is can be routed back behind the mounting plate so that it is protected from crushing and cutting by intrusion of material from past the tank in an incident. This CNG line protector could take many shapes including a complete cover of the recessed area for further protection.

Figure 12B:
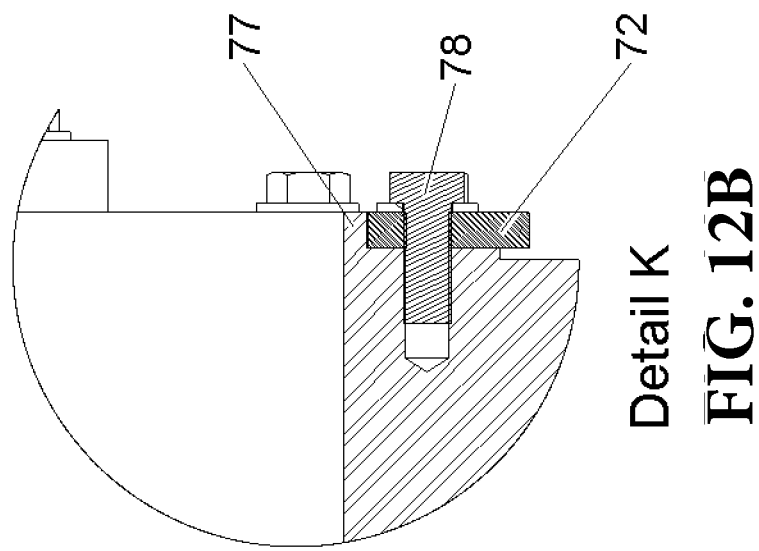
FIG. 12B is a detail view of FIG. 12A further illustrating the plate and pilot mounting feature.
Figure 12A:
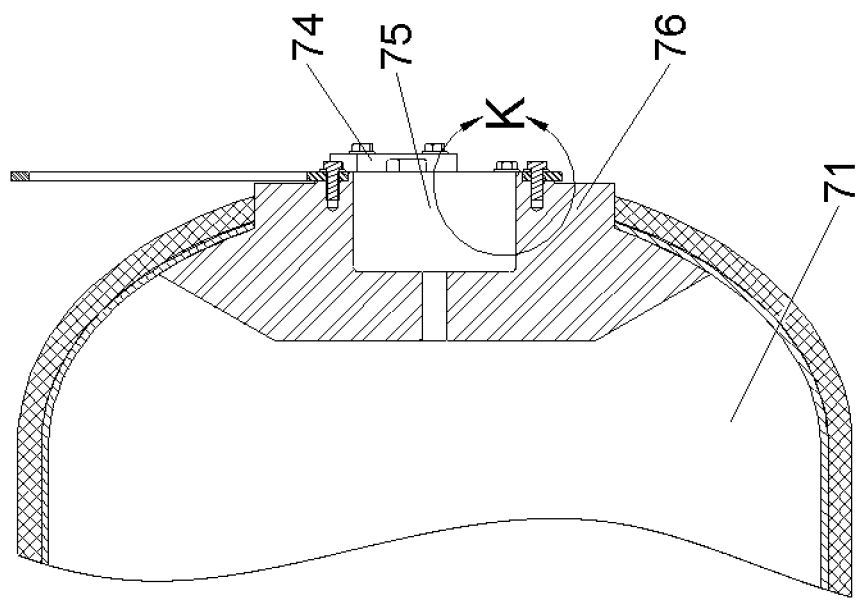
FIG. 12A is a cross section view of a large Type 4 CNG cylinder illustrating the recessed end cavity for protective installation of the pressure relief and shutoff valve.

FIG. 12A is a cross section of one end of the CNG cylinder 71 further illustrating the recessed area 75 for the valves and the low profile of the CNG fuel line protector 74. In this case the recessed area 75 is part of a CNG tank end fitting 76 and has a standard 1.125-12 threaded hole that would be machined into the boss of a standard CNG cylinder. CNG tank end fitting could also be redesigned so that a valve assembly could be bolted in with an o-ring. This valve assembly could be an on off valve that was electrically or air operated and would automatically shut off with a loss of power or pressurized air in a catastrophic event.

In FIG. 12A the CNG tank end fitting 76 is shown as a solid piece, it would most likely be cast or machined to have structural webbing making the part lighter and leaving more internal space for compressed gaseous fuel.

FIG. 12B is a Detail View of FIG. 12A illustrating how the cylinder pilot feature 77 is captured by the piloting hole in mounting plate 72, and the two components are held together by bolts 78. This direct bolting arrangement solves another mounting issue that strap mounting systems can suffer from. Each time a strap mounted CNG cylinder expands and contracts slightly during a fill and empty cycle, it can pivot slightly in its mounts. As rail equipment stays in service for many decades, this possible pivoting of tanks over time that can't be seen inside of a protective enclosure could be a problem. Pivoted far enough it could pinch or rupture a CNG fuel line.

FIG. 13A a locomotive 85 is shown fitted with LNG tank assy 86 and the LNGPM 87. The LNGPM 87 can be mounted directly to the LNG tank as shown or mounted remotely in applications where necessary to do so.

In FIG. 13B the LNGPM 87 is shown connected to the LNG pressure vessel 88 through the fill port 93 and the vent port 89. The fill port 93 connects to the LNGPM 87 at the pump manifold 92; LNG is then pumped from the pump manifold into the riser tube 91 that is contained within a vacuum sealed pressure vessel 90.

Figure 14:
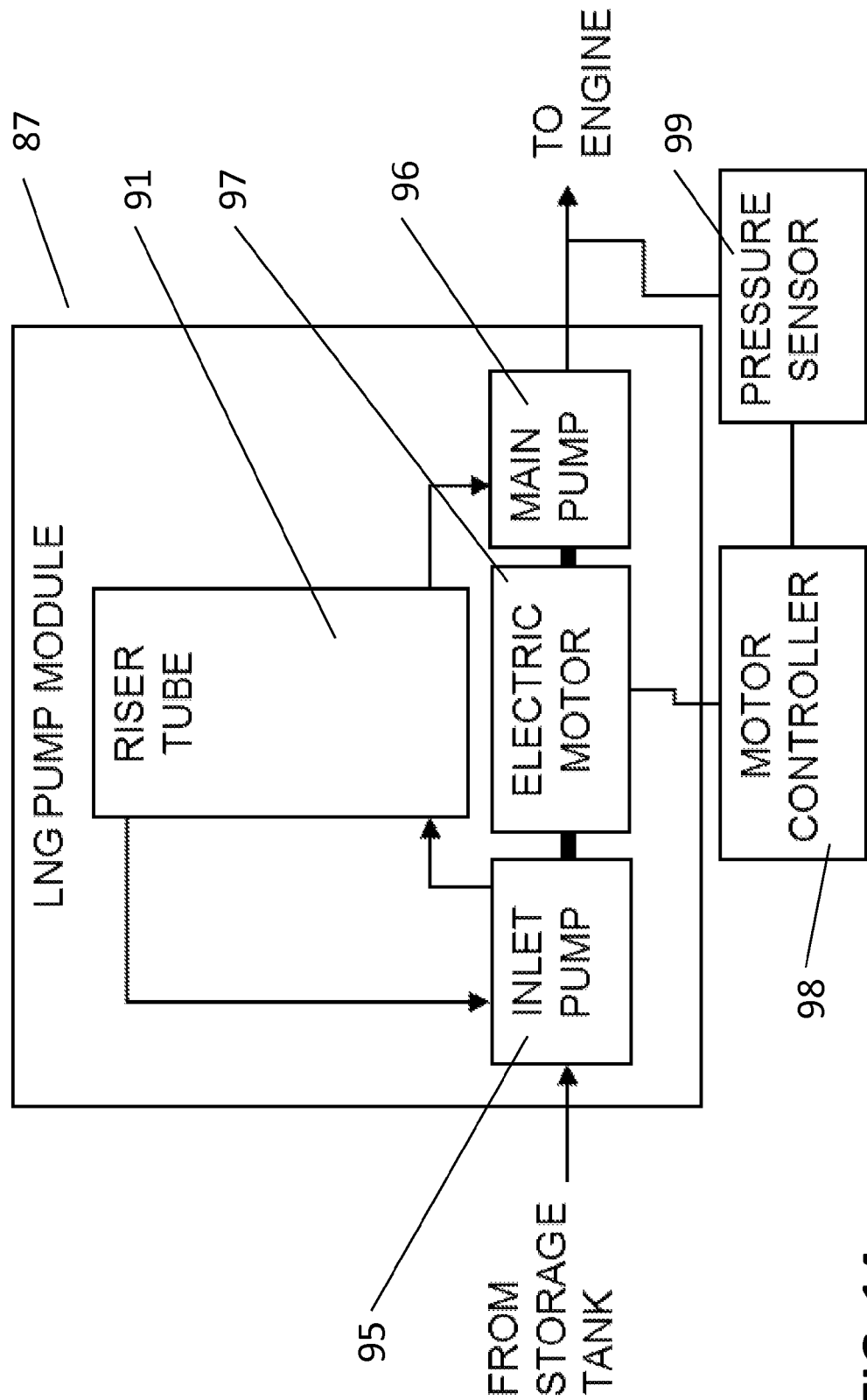
FIG. 14 is a block diagram of the LNG pump module system.

FIG. 14 illustrates a functional block diagram of the preferred embodiment of the LNGPM 87. With the possible exception of the sensors 99 and controller 98, these components are built into a compact, insulated "module" that can be mounted locally or remotely making it easily integrated into various mobile applications. The pump manifold 92 can serve as the primary structure of the LNGPM 87 and can contain the motor 97, inlet pump 95 and main pump 96. The inlet and mounting interface on the pump manifold 92 can be the side face of the side face of the pump manifold 92 allowing it to be mounted near or directly to the end of an LNG storage tank. The top surface of the manifold can have the necessary provisions to house the riser tube 91 inside a vacuum insulated sealed pressure vessel 90. The pressure vessel 90 will contain the output port and vent port interfaces necessary to attach and interface with vent port 89 and the locomotive 85 fuel system.

The pump manifold 92 can contain an the electric motor 98 which in this embodiment is to be a "wet" electric motor sealed within the pump manifold 92 to avoid the need for mechanical seals that present reliability issues. The motor 98 can be sized and configured within the pump manifold 92 such that it may drive the main pump sufficiently to generate the necessary flow and pressure. An inlet pump 95 can be included to address low inlet pressure conditions and serve to prime the main pump 96 by filling the riser tube 91 within the pressure vessel 90 above the pump manifold 92. The bearings for the motor 97 will be selected based on the load, temperature and lubrication conditions. The two pump stages can be positive displacement type (gerotor or gear) as the flow and pressure of the pumps is directly proportional to the speed and torque applied to the inlet pump 95 and main pump 96 through direct or indirect interface with the shaft of the motor 97.

Control and monitoring of the LNGPM output flow and pressure is to be managed via external interface with the controller 98. Controller 98 can be software configurable to allow the pump to provide user defined LNG flow and pressure over its operating range by varying the motor 97 speed.

Figure 15:
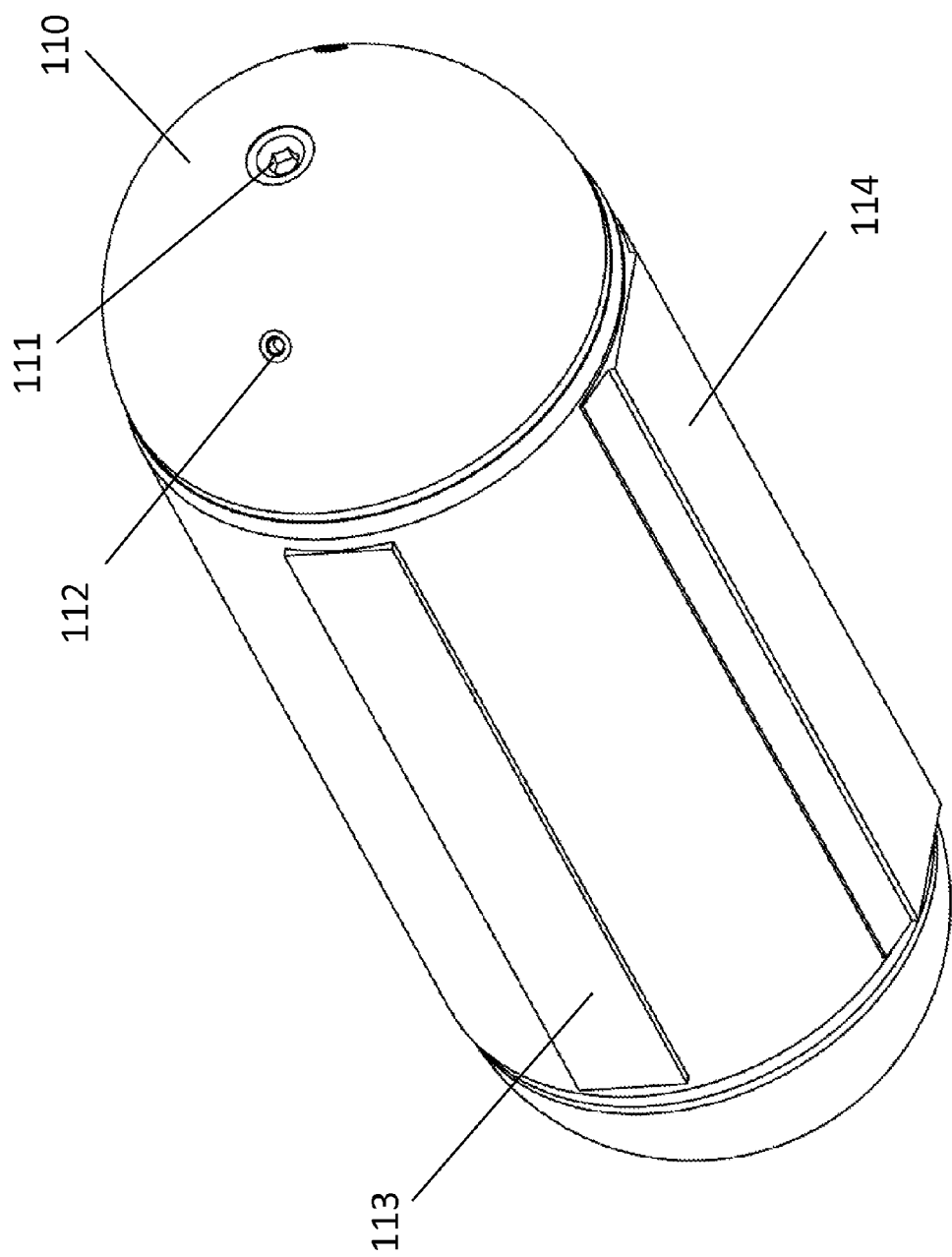
FIG. 15 is an isometric view of a Type 2 cylinder without a neck.

FIG. 15 illustrates a preferred embodiment of a Type 2 cylinder 110 for use in an underframe enclosure. In this case the end of the cylinder 110 is spherical in shape, a purely spherical shape has an advantage of allowing flexibility in how and where the restraining system contacts the cylinder 110 and makes it easier to have it contact the cylinder surface easily. This system would still function with a more elliptical shaped cylinder end, but he contact system would have to accommodate that shape.

Offset porting is illustrated with a single visible port 112 offset to the side at 45 degrees. In the preferred embodiment, there would be four such ports 112, located symmetrical left to right and on both ends of the cylinder 110 for flexibility in mounting of the system, but the system could function with only one port 112 machined into the cylinder 110.

Also visible is the cylinder liner end plug 111, an optional feature. The cylinders 110 could be made with closed ends with no fitting or plug at the end, but the addition of the this plug 111 allows for some manufacturing options and easy visual inspection as needed throughout the service life of the cylinder 110.

Also illustrated in are the cylinder side plate 113 and the cylinder bottom plate 114. In this configuration it allows for restraining features to push the cylinder 110 down against the floor and axially along the locomotive length against one wall of the enclosure. In this embodiment they are designed as low cost aluminum extrusions, but they could be designed from any material that allows them to safely protect the wire wrapping of the Type 2 cylinder 110 as it contacts the surface of the enclosure. These conformal bottom and side plates could also be used with any Type pressurized cylinder in this application from Type 1 to Type 5.

In the cylinder bottom plate 114 is visible the extra feature on each side that will overlap with the vertical midwall plate gussets 117. These will be further detailed in another figure.

Figure 16:
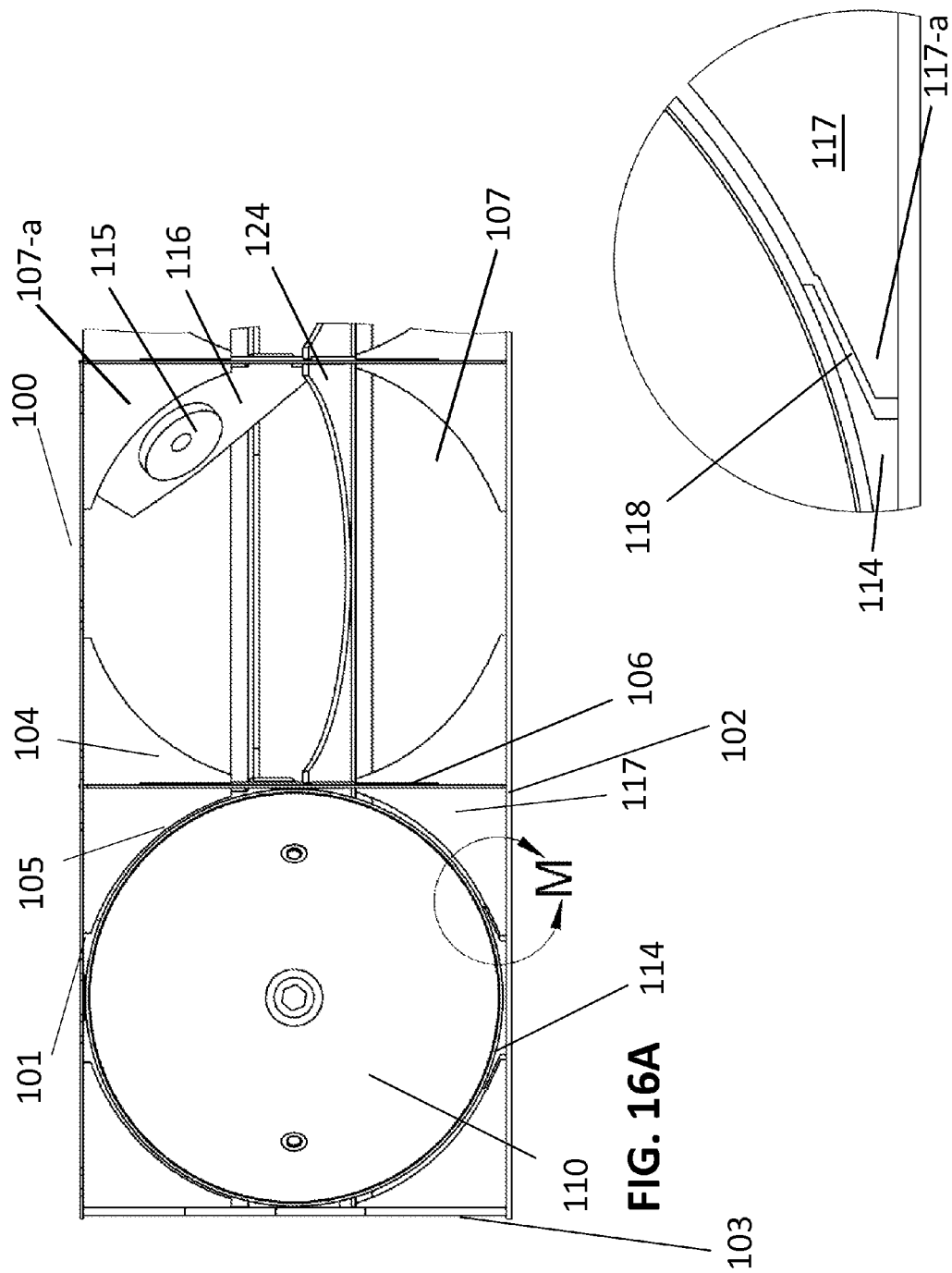
FIG. 16A is a side view of a CNG enclosure with one large diameter CNG cylinder installed and one empty bay for a second CNG cylinder.
FIG. 16B is a detail view of FIG. 16A illustrating the bottom plate and mid wall vertical gusset overlap.

FIG. 16 is a partial side view of a single 37" diameter Type 2 cylinder 110 in one of two bays of a CNG enclosure that would mount below a locomotive frame. This enclosure is likely to include from two to six bays for insertion of CNG cylinders 110.

In the empty bay on the right side of FIG. 16 is visible the fixed compound angle cylinder contact pad 115. This pad 115 will be at a compound angle, and when the hemispherical head of the Type 2 cylinder is pressed against it, it will react to that force by pushing the cylinder 110 both against the left vertical wall and down towards the ground. In this embodiment, the pad 115 is fixed and not adjustable. Also in this instance, the fixed pad 115 is mounted to a flexible mounting plate 116 that is specifically designed with some capability for displacement to allow for axial cylinder growth when filled to its maximum operating pressure. When the cylinder 110 attempts to expand axially going from no pressure to its maximum fill pressure, the flexible plate 116 will allow the contact pad 115 to move slightly accommodating the cylinder axial length increase. This mounting plate 116 could be designed more rigid, as long as the opposing contact pad mounting system has enough displacement capability to make up for the lack of displacement capability of the fixed contact pad 115.

One of the requirements for a crash worthy fuel cylinder system on a locomotive is that the bottom of the system be able to absorb the vertical loading from a Jackknife Derailment incident. This is defined in 49 CFR Part 238 Appendix D, that the fuel cylinder shall support a sudden loading of one-half the locomotive at a vertical acceleration of 2 g without exceeding the ultimate tensile strength of the material. The load is assumed on one piece of rail distributed between the longitudinal centerline and the edge of the cylinder bottom. With a typical six-axle locomotive this would be approximately 400,000 pounds of force pushing up vertically through a 2-inch wide rail along approximately 48" of enclosure floor surface. If this load were directly under the vertical midwall, then the load would be carried by the midwall, which may buckle and deform slightly until the nearby CNG cylinder surfaces prevented further wall displacement. In physical testing of subsections, a ¼ mild steel wall with a ¼ total gap between the cylinder and enclosure wall surfaces was able to withstand this loading. An alternate loading has the rail surface applying the vertical load directly underneath the center of the CNG cylinder. In this case the CNG cylinder would absorb most of the vertical load and transmit it into the locomotive underframe through vertical displacement of the floor and CNG cylinder 110 until the CNG cylinder 110 contacted the top surface of the enclosure that would be in contact with the locomotive under frame.

It is the third, midspan scenario of the jackknife derailment loading where the vertical load is applied in between the vertical wall and the center of cylinder 110 that is most challenging.

Illustrated in FIGS. 16A and 16B is the overlap area 118 where a section of the vertical midwall gusset plates 117 protrudes horizontally underneath the cylinder bottom plate 114. If there were a condition where the bottom of the enclosure was subject to a vertical load between the center of the cylinder 110 and the vertical midwall, this would attempt to rotate the vertical midwall gusset 117 and force it up into the outer surface of the CNG cylinder 110. As the vertical midwall gusset 117 is a plate of steel, where it would contact the cylinder 110 could have an edge that cuts through some of the wire winding. Even if not a sharp edge, the blunt plate body could displace the winding fibers enough to have them rupture or snap. A combination of vertical loading and side impact could force the CNG cylinder 110 to move axially along this intruding metal plate damaging even more fibers. Either cutting or rupturing the fibers will reduce the CNG cylinder's 110 ability to contain the high pressure gasses without a liner rupture. This overlap area 118 allows the protruding part of the vertical midwall gusset 117 to move up until it contacts the overlapping part of the cylinder bottom plate 114. At this point the Type 2 cylinder 110 would absorb some of the vertical load. Because the vertical gusset 117 is stopped by the conformal cylinder seat plate 114, the sharp edges of the vertical gusset 117 are unlikely to travel far enough towards the cylinder 110 to damage the wire winding of the Type 2 cylinder 110.

Figure 17:
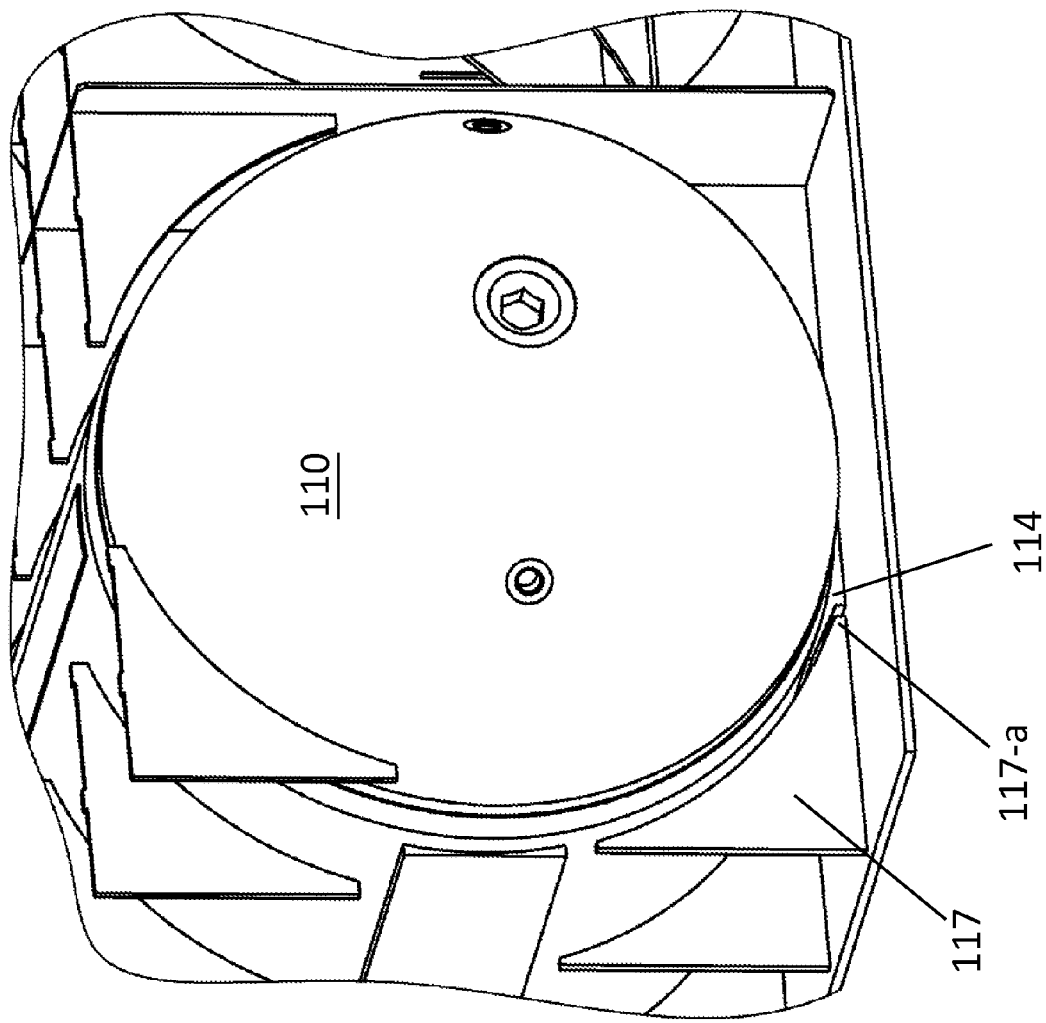
FIG. 17 is an isometric detail view of the enclosure illustrating the vertical gusset and cylinder bottom plate.

FIG. 17 is an isometric cropped view similar to FIG. 16 but from a different angle. It again illustrates the overlap area 118 where the vertical midwall gusset 117 would move up into the cylinder bottom plate 114 under certain vertical loading conditions.

Figure 18:
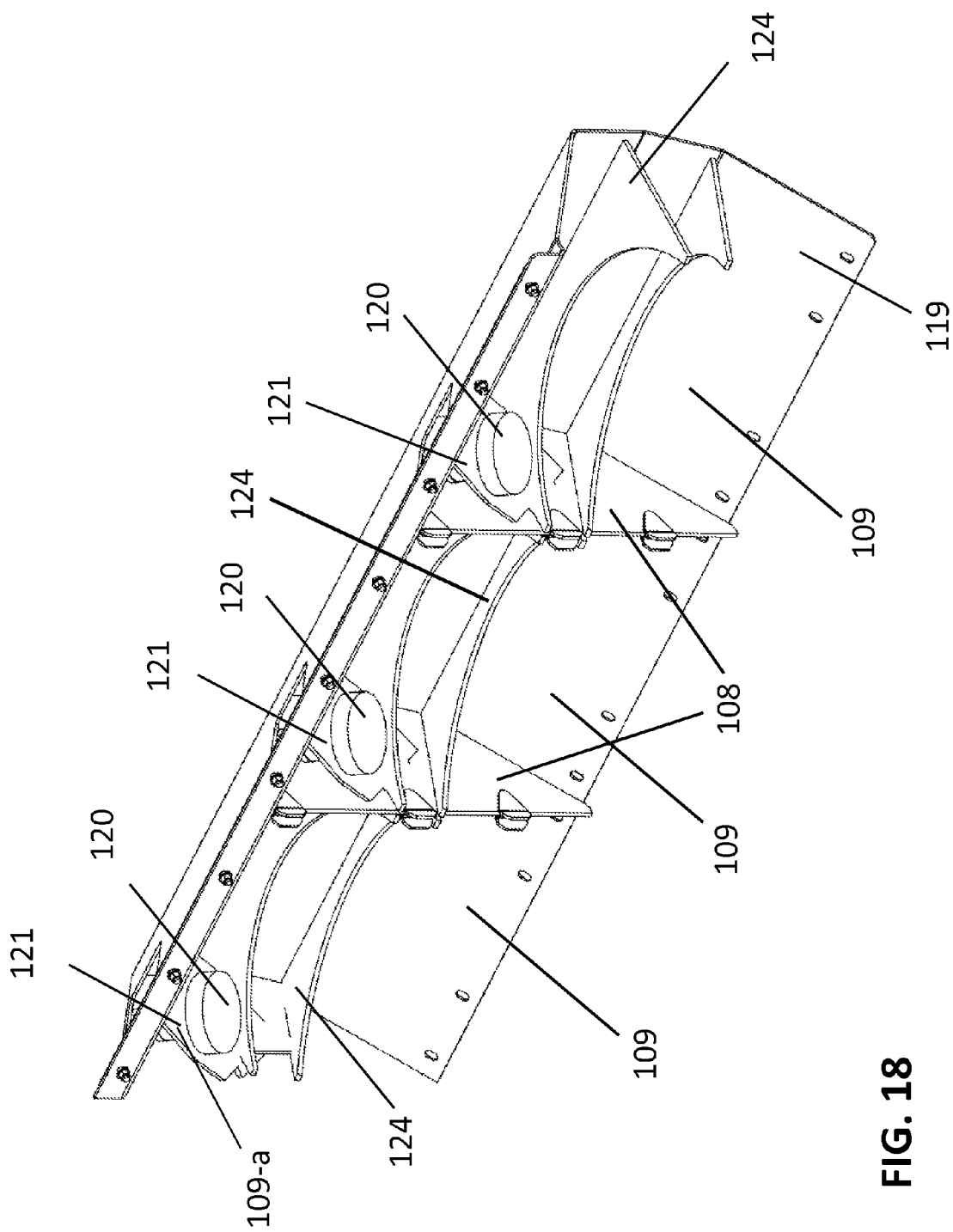
FIG. 18 is an isometric view of a removable enclosure panel illustrating the adjustable cylinder contact pads at a compound angle to the axis of the CNG cylinder.

The FIG. 18 is an isometric view of a removable side panel 119 to a CNG enclosure. This door panel 119 would cover the bays for three CNG cylinders 110. Contact pads 120 that contact the spherical end of the cylinder 110 will be opposite the fixed pads 115 at the back of the enclosure. Both pads 115, 120 push at compound angles pushing the cylinder 110 against the same side wall and down against the floor. In the illustrated embodiment, each contact pad 120 is mounted on a fixed mounting plate 121. In other embodiments, the mounting plate 121 and/or the door panel 119 could be flexible.

The Type 2 cylinders 110 are located by these four points of contact; one side wall, the floor and the pair of opposing compound angle pads 115, 120.

Figure 19:
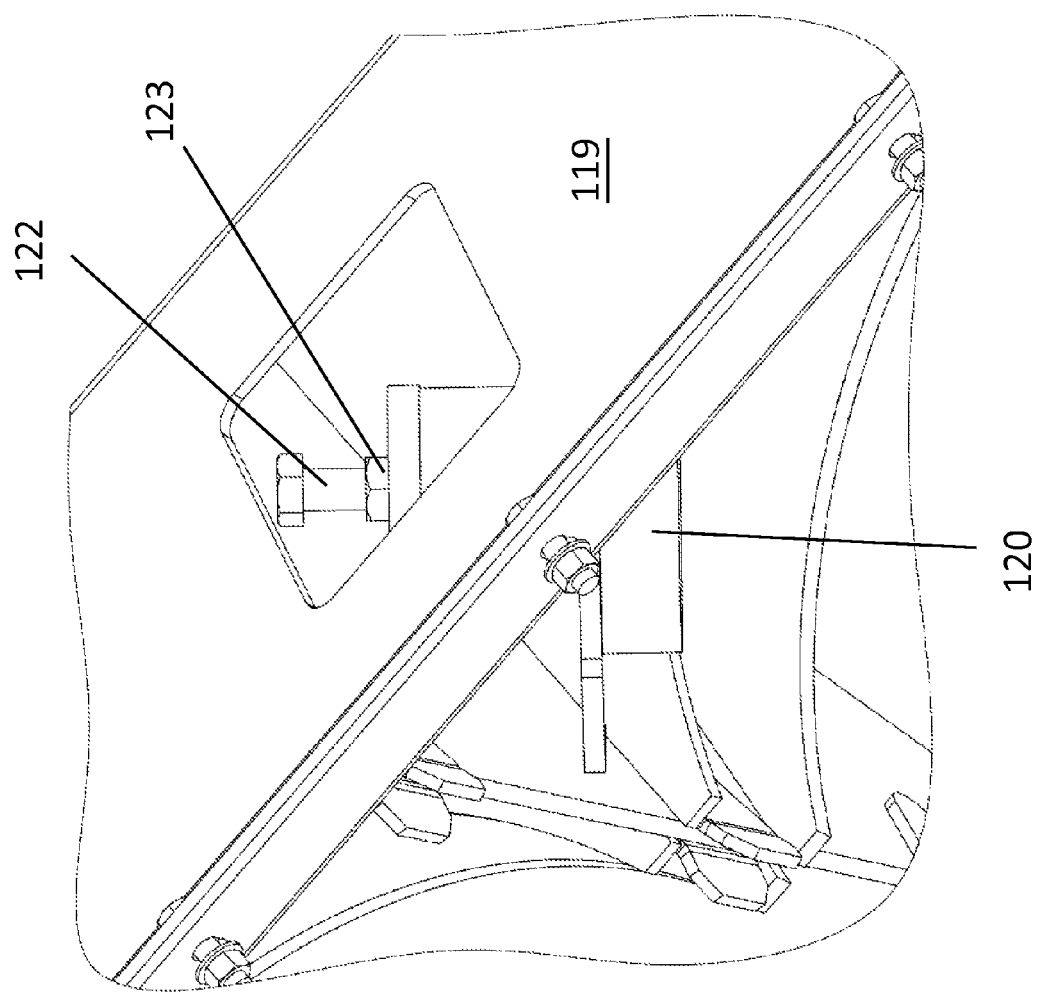
FIG. 19 is an isometric detail view of the adjusting bolt for the adjustable contact pad.

FIG. 19 is a close up view of the same removable side panel 119 from the previous figure. In this figure is visible the adjusting bolt 122 and locking nut 123 that push the movable pad 120 into the Type 2 cylinder 110. This movement of approximately ¾ of an inch allows for manufacturing tolerances and also preloading the plates 116, 121 that mount the pads 115, 120 at each end of the enclosure.

The removable side panel 119 is attached to the enclosure after the cylinders 110 are inserted into the enclosure and the gas plumbing lines are attached. After this the movable pads 120 can be adjusted from outside of the enclosure. Each pad 120 will likely be tightened until it contacts its cylinder 110, and then tightened additionally to move the cylinder 110 to its installed position. It could then be loosened and set to a nominal low torque to preset the cylinder 110. After this is done to all the cylinders 110, all of the individual pad locating bolts 122 can each be turned a specified number of degrees to preload the pads 115, 120 and the plates 116, 121 they are attached to. These locating plates 116, 121 can act as springs, as can the structure of the removable side panel 119.

In the examples shown, an example of an enclosure 100 for containing cylinders 110 includes an upper surface 101, a lower surface 102, opposing side walls 103 spanning the upper and lower surfaces 101, 102, and an end surface 104 spanning the upper and lower surfaces 101, 102, the upper surface 101, lower surface 102, side walls 103, and end surface 104 defining an enclosed space 105. A plurality of inner walls 106 divide the enclosed space 105 to define bays 107 that receive cylinders 110. A removable door panel 119 is opposite the end surface 104 and includes dividers 108 defining portions 109 of the door panel 119 corresponding to the bays 107. The enclosure 100 includes a plurality of first contact pads 115 and a plurality of first mounting plates 116, each first contact pad 115 mounted on a first mounting plate 116 on the end surface 104. At least one first contact pad 115 is positioned in a corner 107-a of each bay 107 at an angle that is neither parallel or perpendicular to either the side walls 103 or the upper surface 101 and contacts the received cylinder 110. The enclosure 100 also includes a plurality of second contact pads 120 and a plurality of second mounting plates 121, each second contact pad 120 mounted on a second mounting plate 121 on the removable door panel 119, wherein at least one second contact pad 120 is positioned in a corner 109-a of each portion 109 at an angle that is neither parallel or perpendicular to either the side walls 103 or the upper surface 101 and contacts the received cylinder 110 when the removable door panel 119 is secured to the enclosure 100.

In one embodiment, the enclosure 100 includes a plurality of vertical gussets 117, each secured to the lower surface 102 and one of the inner walls 106 and side walls 103. Each received cylinder 110 includes a cylinder plate bottom 114, and a lower edge of each gusset 117-a is positioned below the adjacent cylinder plate bottom 114. In another embodiment, the enclosure 100 also includes horizontal gussets 124, each secured to the end surface 104 within each bay 107.

In some embodiments, each of the plurality of first contact pads 115 is fixed. In other embodiments, each second flexible mounting plate 121 is mounted to the removable door 119 by an adjusting bolt 122 and locking nut 123 that push the second contact pad 121 against the cylinder 110. In still further embodiments, the plurality of first mounting plates 116 is integral with the end surface 104. In other embodiments, the plurality of second mounting plates 121 is integral with the removable door panel 119. In another embodiment, one of the plurality of first mounting plates 116 and the plurality of second mounting plates 121 is flexible.

Figure 20:
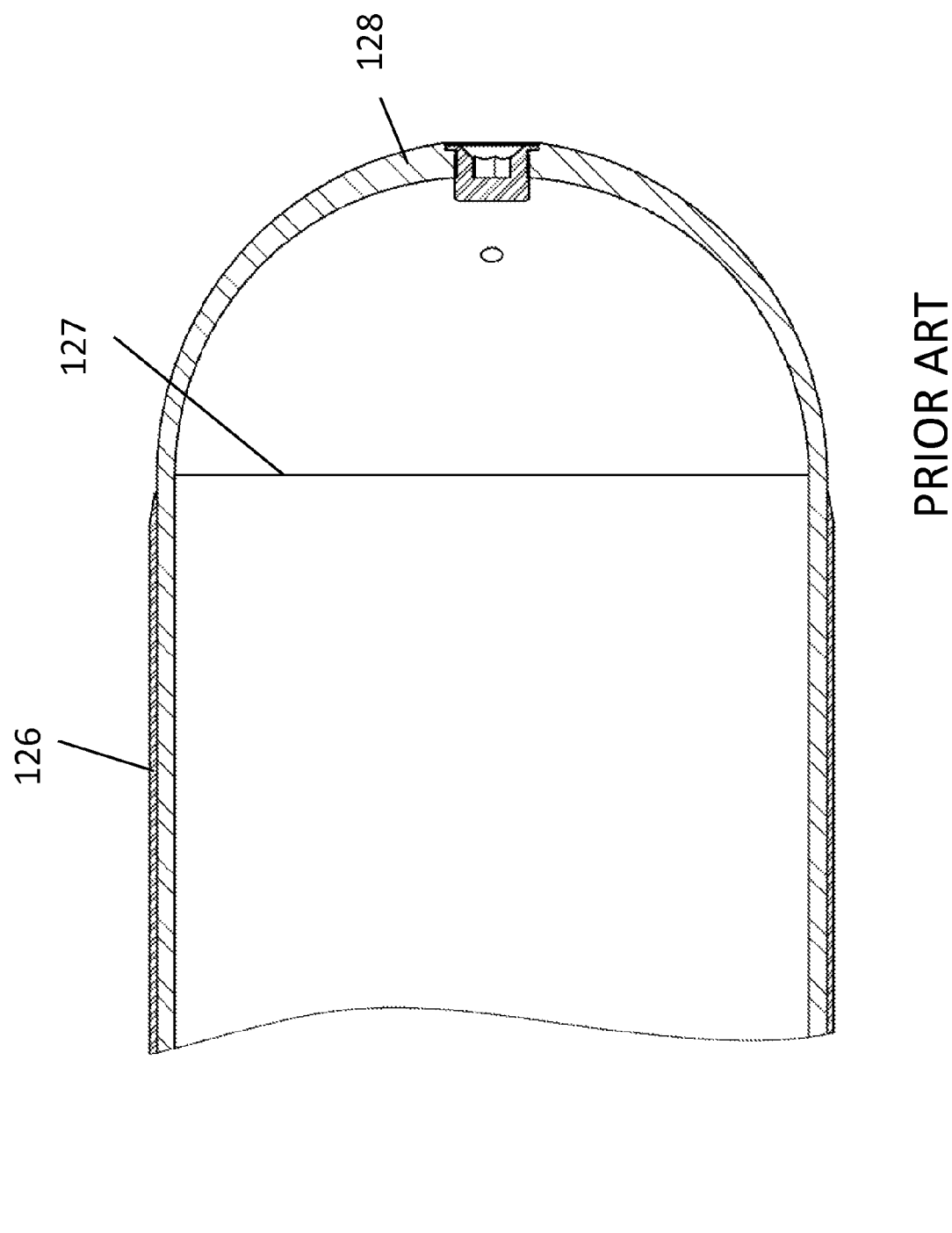
FIG. 20 is a cross section view of a conventional Type 2 cylinder.

FIG. 20 illustrates a conventional wire wound Type 2 cylinder 110, clearly visible is the wire wrapping 126 stopping short of the tangency point 127. Although there is no wire wrap 126 reinforcing at the tangency point 127, some of the hoop stress at the tangency point 127 is taken up by the neighboring material that is supported by wire wrapping 126. Possibly the wire wrapping 126 can be thicker at the end 111 before it tapers off to increase this effect. It is the reliance on this neighboring material to transmit the hoop stresses to the wire wrapping 126 that forces the compromise to using a thicker liner than ideal.

Figure 21:
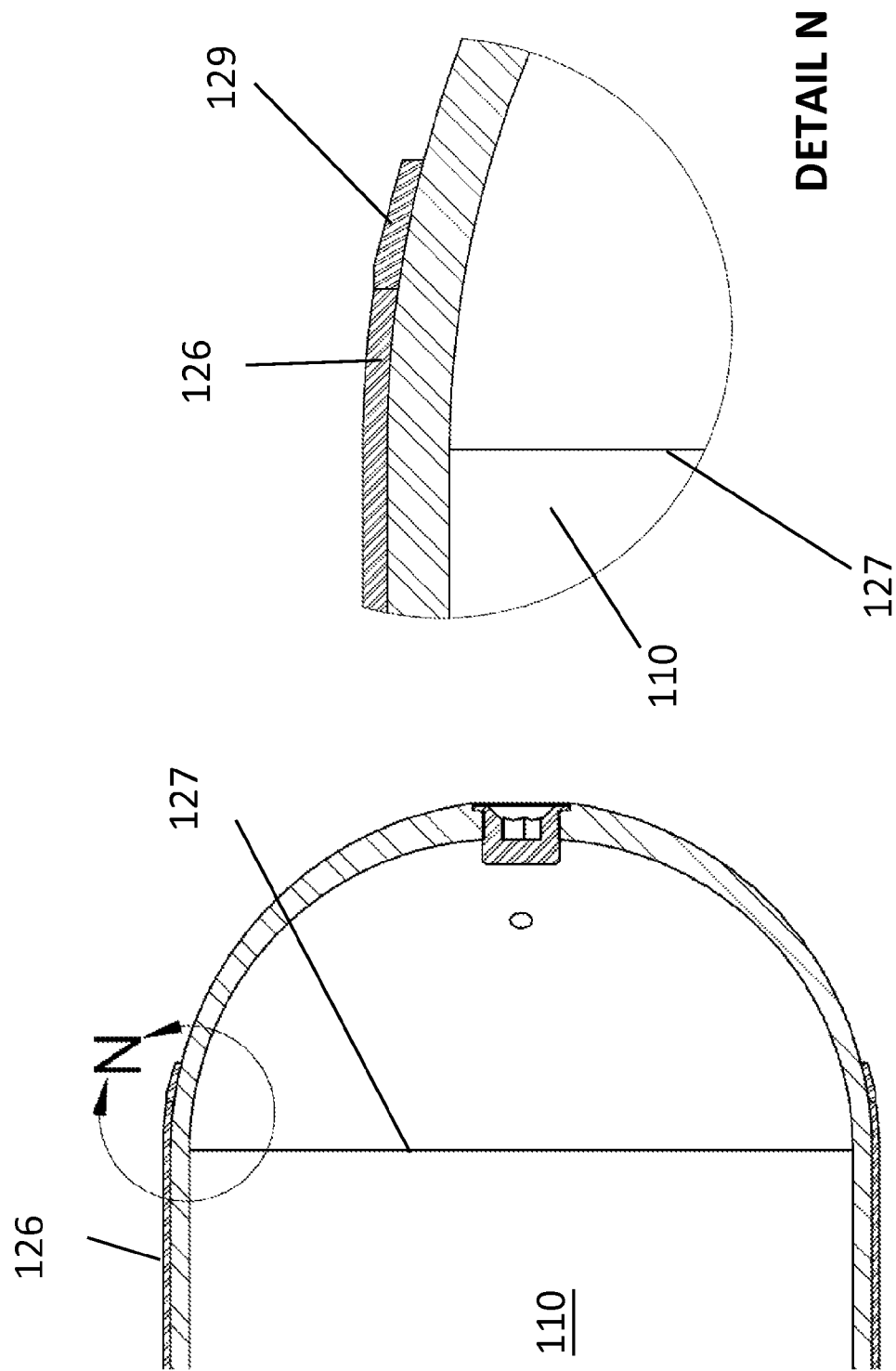
FIG. 21A is a section view of a modified Type 2 cylinder with a brazed on blocking ring and corresponding extended wire wrap.
FIG. 21B is a close up detail of FIG. 21A.

FIGS. 21A and 21B are one solution to the problem of building up a wall for the wire wrap 126 to lead up to. This approach will add a ring 129 of material to the tank surface. The proposed method of attaching the ring 129 is a low temperature brazing or solder process which should be done at a temperature equal to or lower than the tempering temperature of the heat treated liner. Thick sections of 4130 can be tempered at 480 C and retain 110 ksi yield, typical Type 1 cylinder material properties call for a minimum yield of 88 ksi.

Using an external ring 129 will require an extra part to be made and preparation for the brazing process. It is possible that the brazing process can be done the same time as the tempering process. As the force attempting to move the wrapping wires 126 axially is relatively small compared to the hoop stress of the cylinder 110, the ring 129 can be made of weaker and more ductile material than the cylinder liner. There is a large area available for the braze joint to absorb the axial load on the ring 129.

For initial production, the rings 129 could be manufactured out of arc shaped segments cut from plate that are rolled into cones and welded into one piece. As the ring weld joint is not structurally required to absorb the hoop stress of the cylinder 110, welding should be allowable for cylinder design certification and initial low volume production. Another feature making the weld joint in the ring less of a concern is that in front of the blocking wall feature is an area of lower hoop stress, and possibly a thicker wire wrap as the cylinder liner surface is moving down the tapered surface of the cylinder liner end dome.

After welding into a cone and heat treating or annealing, the ring 129 will only need a single turning operation on a lathe to be the appropriate size. This operation would establish the blocking wall angle and height and add the appropriate curvature to the surface of the ring 129 that will be brazed to the cylinder dome. In this surface, the braze bond gap can be manipulated from one side of the ring 129 to the other. One possible configuration of this surface is to have the braze gap start out larger, reduce to some minimal gap and then increase again. As the thicker braze gaps will be at each edge of the ring, there will be less of a chance of cracking due to pressure cycling of the cylinder.

Once accepted into an acceptable technique for wire wound Type 2 tanks, special press tooling could be acquired and these rings could be stamped in a single process from plate material or rings cut from large diameter seamless tubing. 36" OD seamless 4130 tubing is available in ⅜" and ½" wall.

If making the part from seamless tubing, a more economical rolling process could be used where the ring is rolled between two roller forms. The rollers establish the ring contours and shape; then the final gap between the rollers at the end of the process determines the final diameter.

Described above are economical ways to both fabricate prototypes and then later produce in higher volumes a large diameter blocking ring for 36" OD Type 2 cylinder liners. Also described is the opportunity to low temperature braze or solder these rings on to the cylinder liner during the tempering process of the cylinder liner. With economically produced rings and minimal additional processing of the cylinder liners, it is possible to further lower the weight and cost of Type 2 liners while also adding storage capacity.

There may be alternate ways to build up the wire wrap blocking wall feature without the addition of this blocking ring, but the use of a brazed on blocking ring allows for further reducing the wall thickness of wire wound Type 2 cylinder liners with minimal or no changes to current spin forming tooling or processes.

Figure 22:
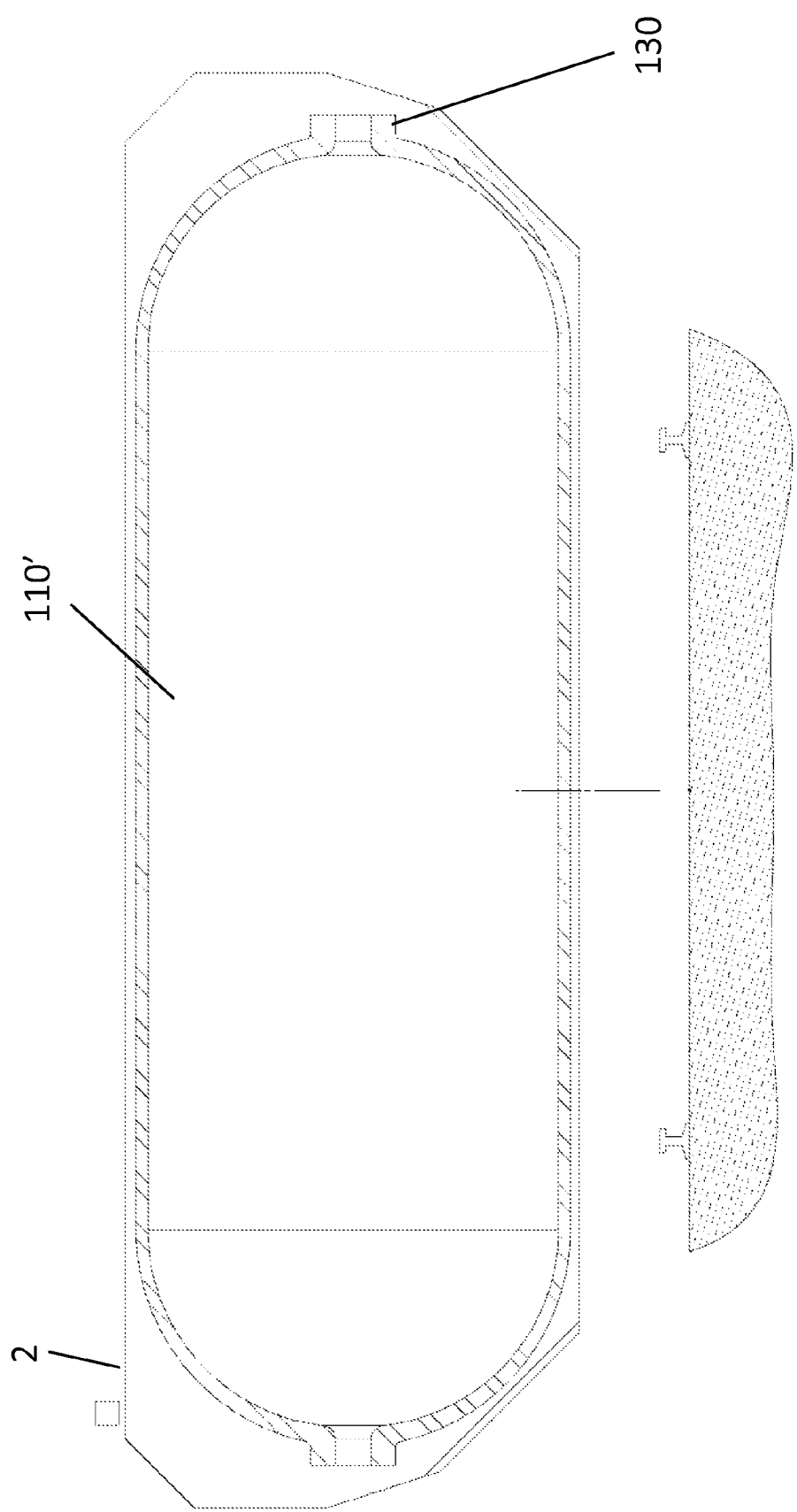
FIG. 22 is a cross sectional view of a cylinder including a stubbed neck.

Referring to FIG. 21A, the cylinder 110 is neckless. FIG. 22 illustrates an alternative embodiment of a cylinder 110' having a stubbed neck 130. The enclosures described above may receive neckless cylinders as well as cylinders including stubbed necks 130 and these cylinders could be type 1 as well as type 2.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. An enclosure for containing cylinders comprising:
   an upper surface, a lower surface, opposing side walls spanning the upper and lower surfaces, and an end surface spanning the upper and lower surfaces, the upper surface, lower surface, side walls, and end surface defining an enclosed space,
   a plurality of inner walls dividing the enclosed space to define bays that receive cylinders;
   a removable door panel opposite the end surface, the removable door panel including dividers defining portions of the door panel corresponding to the bays;
   a plurality of first contact pads and a plurality of first mounting plates, each first contact pad mounted on a first mounting plate on the end surface, wherein at least one first contact pad is positioned in a corner of each bay at an angle that is neither parallel or perpendicular to either the side walls or the upper surface and contacts the received cylinder; and
   a plurality of second contact pads and a plurality of second mounting plates, each second contact pad mounted on a second mounting plate on the removable door panel, wherein at least one second contact pad is positioned in a corner of each portion at an angle that is neither parallel or perpendicular to either the side walls or the upper surface and contacts the received cylinder when the removable door panel is secured to the enclosure.

2. The enclosure of claim 1, further including a plurality of vertical gussets, each secured to the lower surface and one of the vertical walls and side walls.

3. The enclosure of claim 2, wherein each received cylinder includes a cylinder plate bottom, and wherein a lower edge of each gusset is positioned below the adjacent cylinder plate bottom.

4. The enclosure of claim 1, further including horizontal gussets, each secured to the end surface within each bay.

5. The enclosure of claim 1, wherein each of the plurality of first contact pads is fixed.

6. The enclosure of claim 1, wherein each second flexible mounting plate is mounted to the removable door by an adjusting bolt and locking nut that push the second contact pad against the cylinder.

7. The enclosure of claim 1, wherein the plurality of first mounting plates is integral with the end surface.

8. The enclosure of claim 1, wherein the plurality of second mounting plates is integral with the removable door panel.

9. The enclosure of claim 1, wherein one of the plurality of first mounting plates and the plurality of second mounting plates is flexible.

* * * * *